(12) United States Patent
Xia et al.

(10) Patent No.: US 12,136,530 B2
(45) Date of Patent: *Nov. 5, 2024

(54) TRANSFORMATION METHOD FOR GAS DENSITY RELAY, AND GAS DENSITY RELAY HAVING ONLINE SELF-CHECK FUNCTION AND CHECK METHOD THEREOF

(71) Applicant: SHANGHAI ROYE ELECTRIC CO., LTD., Shanghai (CN)

(72) Inventors: Tiexin Xia, Shanghai (CN); Bing He, Shanghai (CN); Min Chang, Shanghai (CN); Zhengcao Guo, Shanghai (CN); Haiming Liao, Shanghai (CN); Haiyong Jin, Shanghai (CN); Enlin Wang, Shanghai (CN)

(73) Assignee: Shanghai Roye Electric Co., Ltd., Shanghai (CN)

( * ) Notice: Subject to any disclaimer, the term of this patent is extended or adjusted under 35 U.S.C. 154(b) by 249 days.

This patent is subject to a terminal disclaimer.

(21) Appl. No.: 17/640,778

(22) PCT Filed: Aug. 26, 2020

(86) PCT No.: PCT/CN2020/111251
§ 371 (c)(1),
(2) Date: Mar. 4, 2022

(87) PCT Pub. No.: WO2021/043039
PCT Pub. Date: Mar. 11, 2021

(65) Prior Publication Data
US 2022/0336170 A1 Oct. 20, 2022

(30) Foreign Application Priority Data

Sep. 4, 2019 (CN) .......................... 201910830188.5
Sep. 4, 2019 (CN) .......................... 201910830193.6
Sep. 4, 2019 (CN) .......................... 201910830232.2

(51) Int. Cl.
*G01N 9/26* (2006.01)
*H01H 35/26* (2006.01)
(Continued)

(52) U.S. Cl.
CPC ............... *H01H 35/26* (2013.01); *G01N 9/26* (2013.01); *H01H 35/32* (2013.01); *H01H 35/36* (2013.01); *H01H 2300/052* (2013.01)

(58) Field of Classification Search
CPC .. H01H 35/32; H01H 2300/052; H01H 35/36; H01H 35/26; G01N 9/26; G01R 31/00
See application file for complete search history.

(56) References Cited

U.S. PATENT DOCUMENTS

| | | | | |
|---|---|---|---|---|
| 4,652,831 A | * | 3/1987 | Ferraro | ................ G08B 17/117 |
| | | | | 324/464 |
| 5,388,451 A | * | 2/1995 | Stendin | .................... H02H 7/22 |
| | | | | 361/37 |
| 5,693,873 A | * | 12/1997 | Thuries | ................ H02B 13/065 |
| | | | | 73/30.01 |

FOREIGN PATENT DOCUMENTS

| | | |
|---|---|---|
| CN | 201034901 | 3/2008 |
| CN | 101206169 | 6/2008 |

(Continued)

*Primary Examiner* — Jermele M Hollington
*Assistant Examiner* — Taqi R Nasir
(74) *Attorney, Agent, or Firm* — Hsuanyeh Law Group, PC

(57) ABSTRACT

The application provides a modification of gas density relay, a gas density relay with online self-check function and its check method for high-voltage and medium-voltage electrical equipment. The gas density relay includes a gas density relay body, a gas density sensor, a pressure regulating mechanism, a valve, an online check contact signal sampling unit and an intelligent control unit. The pressure is increased or decreased by the pressure regulating mechanism to enable the contact action of the gas density relay body. The contact action is transmitted to the intelligent control unit through the online check contact signal sampling unit. The intelligent control unit detects the alarm and/or blocking contact signal operating value and/or return value of the gas density relay body according to the density value of the contact action; the check of the gas density relay can be completed without maintenance personnel on site. It has remote reading function to realize free maintenance and significantly improve the reliability of the power grid and the work efficiency, as well as reduces the O&M cost.

20 Claims, 10 Drawing Sheets

(51) Int. Cl.
*H01H 35/32* (2006.01)
*H01H 35/36* (2006.01)

(56) References Cited

FOREIGN PATENT DOCUMENTS

| | | |
|---|---|---|
| CN | 101221217 | 7/2008 |
| CN | 201804791 | 4/2011 |
| CN | 202049901 | 11/2011 |
| CN | 102841282 | 12/2012 |
| CN | 202815181 | 3/2013 |
| CN | 103913704 | 7/2014 |
| CN | 104299843 | 1/2015 |
| CN | 206804807 | 12/2017 |
| CN | 109752649 | 5/2019 |
| CN | 110444442 | 11/2019 |
| CN | 110514996 | 11/2019 |
| CN | 110542853 | 12/2019 |

* cited by examiner

TRANSFORMATION METHOD FOR GAS DENSITY RELAY, AND GAS DENSITY RELAY HAVING ONLINE SELF-CHECK FUNCTION AND CHECK METHOD THEREOF

The present application claims priority for the following patent applications:
1. Application Number: 201910830193.6 (Title: Gas Density Relay with Online Self-check Function and Check Method thereof) applied on Sep. 4, 2019;
2. The application number filed on Sep. 4, 2019 is 201910830188.5 (name of invention: a remote gas density relay system and its check method);
3. Application Number: 201910830232.2 (Title: Gas Density Relay Modification Method) applied on Sep. 4, 2019.

TECHNICAL FIELD

The invention relates to the technical field of electric power, in particular to a gas density relay with an online self-check function, a check method thereof and a modification method for the gas density relay applied to high-voltage and medium-voltage electrical equipment.

BACKGROUND

At present, SF6 (sulfur hexafluoride) electrical equipment has been widely applied to electric power departments and industrial and mining enterprises, and has promoted rapid development of electric power industry. With the rapid development of economy, the capacity of electric power systems in China has expanded rapidly in recent years, and more and more SF6 electrical equipment is consumed. SF6 gas functions in arc extinction and insulation in high-voltage electrical equipment, and safety operation of the SF6 high-voltage electrical equipment is severely affected if the density of SF6 gas in the high-voltage electrical equipment is reduced and micro-water content exceeds standards: 1) insulation and arc extinction performances are lost if the density of SF6 gas is reduced to a certain degree. 2) With the participation of some metals, SF6 gas can hydrolyze with water at a temperature above 200° C., generate active HF and SOF2, corrode insulating parts and metal parts and generate a lot of heat to increase the pressure of the air chamber. 3) When the temperature is reduced, excessive water may form condensed water, which significantly reduces the surface insulation strength of the insulating parts, and even causes flashover and serious harm. Therefore, the power grid operating procedure compulsively stipulates that the density of SF6 gas and the water content should be tested regularly before and during operation of the equipment.

With the development of unattended substations towards networking and digitization and the increasing requirements of remote control and telemetry, the online monitoring of gas density and moisture content of SF6 electrical equipment is of great practical significance. With the continuous rapid development of China's smart power grids, as an important component and key node of a smart substation, smart high-voltage electrical equipment plays a pivotal role in the safety of the smart power grids. At present, most high-voltage electrical equipment is SF6 gas insulation equipment. If the gas density is reduced (due to leakage and the like), the electrical performance of the equipment is severely affected, which causes serious potential hazards in safety operation. At present, online monitoring of gas density values in the SF6 high-voltage electrical equipment has been extremely widespread, so that application of gas density monitoring systems (gas density relays) is flourishing. However, the current gas density monitoring systems (gas density relays) basically function in: 1) Acquiring and uploading density, pressure and temperature by the aid of remote-transmission SF6 gas density relays, so as to realize online monitoring of the gas density. 2) Acquiring and uploading density, pressure and temperature by the aid of gas density transmitters, so as to realize online monitoring of the gas density. SF6 gas density relay is the core and key component. However, due to the harsh environment in the on-site operation of HV substation, especially the strong electromagnetic interference, the remote SF6 gas density relay in the currently used gas density monitoring system (gas density relay) is composed of mechanical density relay and electronic remote transmission part; in addition, the traditional mechanical density relay is still retained in the power grid system using gas density transmitter. The mechanical density relay has one, two or three groups of mechanical contacts, which can timely transmit the information to the target equipment terminal through the contact connecting circuit when the pressure reaches the state of alarm, blocking or overpressure, so as to ensure the safe operation of the equipment. Meanwhile, the monitoring systems have safe and reliable circuit transmission functions. An effective platform is built to achieve real-time data and remote data reading and information monitoring, and information such as pressure, temperature and density can be timely transmitted to target equipment (such as a computer terminal), so as to realize online monitoring.

Regularly checking the gas density relays on the electrical equipment is a necessary measure for nipping in the bud and guaranteeing safe and reliable operation of the electrical equipment. Both Preventive Test Procedure for Electric Power and Twenty-five Key Requirements for Preventing Major Accidents in Electric Power Production require regular checking for the gas density relays. According to practical operation, regularly checking the gas density relays is one of necessary measures for guaranteeing safe and reliable operation of the electrical equipment. Therefore, check of the gas density relays has been already attached great importance to and popularized at present, and various power supply companies, power plants and large factory and mining enterprises have already implemented check of the gas density relays. In order to achieve field check and detection of the gas density relays, the power supply companies, the power plants and the large factory and mining enterprises require testers, equipment vehicles and high-value SF6 gas. According to rough calculation, including business loss due to power outage during detection, the annually shared detection cost of each high-voltage switching station is around tens of thousands to hundreds of thousands yuan. In addition, there are potential safety hazards if testers do not perform standard operation during field check. Therefore, it is very necessary to innovate in the existing self-check gas density relay, especially the online self-check gas density relay or system, to allow the gas density relay or monitoring system realizing online gas density monitoring to have the check function of gas density relay to periodically check (mechanical) the gas density relay without maintenance personnel on the site, thus greatly improving the work efficiency and reducing the cost.

SUMMARY

The invention aims to provide a gas density relay modification method, a gas density relay with an online self-check function and a check method thereof, so as to solve the problems raised in the above background.

In order to achieve the above purpose, the invention adopts the following technical scheme:

The first aspect of the application provides a gas density relay or monitoring device with online self-check function, including a gas density relay body, a gas density sensor, a pressure regulating mechanism, a valve, an online check contact signal sampling unit and an intelligent control unit;

the gas path of the pressure regulating mechanism is connected with the gas density relay body; the pressure regulating mechanism is configured for pressure rise and fall of the gas density relay body, to enable the contact signal action of the gas density relay body;

The gas density detection sensor is communicated with the gas density relay body;

The online check contact signal sampling unit is connected with the gas density relay body and configured to sample the contact signal of the gas density relay body under the ambient temperature;

One end of the valve is provided with an interface connected with the electrical equipment, the other end of the valve is connected with the gas density relay body, or with the gas path of the pressure regulating mechanism to connect the valve with the gas density relay body;

The intelligent control unit is respectively connected with the gas density sensor, the pressure regulating mechanism, the valve and the online check contact signal sampling unit; the unit is configured to manage the closing or opening of the valve, control the pressure regulating mechanism, collect pressure values and temperature values and/or gas density values, as well as check the contact signal operating value and/or contact signal return value of the gas density relay body;

The contact signals include alarm signals and/or blocking signals.

Preferably, the gas density relay body comprises one or more bimetallic strip compensated gas density relay, a gas density relay with gas compensation, a bimetallic strip, a mixed gas density relay with gas compensation, a fully mechanical gas density relay, a digital gas density relay, a mechanical and digital combined gas density relay, a gas density relay with pointer display, a digital display gas density relay, a gas density switch without display or indication, SF6 gas density relay, SF6 mixed gas density relay and N2 gas density relay.

Preferably, the gas density relay body comprises a housing, a base arranged in the housing, a pressure detector, a temperature compensation element and a plurality of signal generators; the signal generator consists of microswitch or magnetically assisted electric contact. The gas density relay body outputs contact signals through the signal generator; the pressure detector consists of Bourdon tube or bellows; the temperature compensation element uses a temperature compensation strip or gas closed in the housing.

More preferably, the gas path of the pressure regulating mechanism is connected with the pressure detector.

More preferably, the other end of the valve is connected with the base and the pressure detector, or the other end of the valve is connected with the gas path of the pressure regulating mechanism, so as to connect the valve with the base and the pressure detector.

More preferably, the online check contact signal sampling unit is connected with the signal generators.

More preferably, the gas density relay body also comprises a display mechanism including a movement, a pointer and a dial, and the movement is fixed on the base or in the housing; the other end of the temperature compensation element is also connected with the movement through a connecting rod or directly connected with the movement; the pointer is installed on the movement and before the dial, and the pointer displays the gas density value in combination with the dial; and/or the display mechanism comprises a digital device or a liquid crystal device with an indication display.

More preferably, the gas density relay body or intelligent control unit also comprises a contact resistance detection unit which is connected with the contact signal or directly connected with the signal generator; under the control of the online check contact signal sampling unit, the contact signal of the gas density relay is isolated from its control loop. When the contact signal of the gas density relay moves and/or when the contact signal of the gas density relay receives the instruction to detect the contact resistance, the contact resistance detection unit can detect the contact resistance value of the contact point of the gas density relay.

More preferably, the gas density relay body or intelligent control unit also comprises an insulation resistance detection unit which is connected with the contact signal or directly connected with the signal generator; under the control of the online check contact signal sampling unit, the contact signal of the gas density relay is isolated from its control loop. When the contact signal of the gas density relay moves and/or when the contact signal of the gas density relay receives the instruction to detect the insulation resistance, the insulation resistance detection unit can detect the insulation resistance value of the contact point of the gas density relay.

Preferably, the gas density sensor is arranged on the gas density relay body; alternatively, the pressure regulating mechanism is arranged on the gas density relay body; alternatively, the gas density sensor, the online check contact signal sampling unit and the intelligent control unit are installed on the gas density relay body; alternatively, the pressure regulating mechanism, the gas density sensor, the online check contact signal sampling unit and the intelligent control unit are installed on the gas density relay body.

More preferably, the gas density relay body and the gas density detection sensor are structurally integrated; preferably, the gas density relay body and the gas density detection sensor form a structurally integrated remote-transmission gas density relay.

Preferably, the gas density detection sensor is structurally integrated.

More preferably, the gas density detection sensor is a structurally integrated gas density transmitter; preferably, the online check contact signal sampling unit and the intelligent control unit are arranged on the gas density transmitter.

Preferably, the gas density detection sensor includes at least one pressure sensor and at least one temperature transducer; alternatively, the gas density detection sensor is the gas density transmitter comprising the pressure sensors and the temperature transducers; alternatively, the gas density detection sensor is a density detection sensor adopting a quartz tuning fork technology.

More preferably, the pressure sensors are mounted on a gas path of the gas density relay body.

More preferably, the temperature transducer is installed on or outside the gas path of the gas density relay body, or inside the gas density relay body, or outside the gas density relay body.

More preferably, the temperature sensor may be a thermocouple, a thermistor, a semiconductor type, a contact type and a non-contact type, a thermal resistance and the thermocouple.

More preferably, at least one temperature transducer is arranged near the temperature compensation element of the gas density relay body or on the temperature compensation element, or integrated in the temperature compensation element. Preferably, at least one temperature transducer is arranged at one end, close to the temperature compensation element, of the pressure detector of the gas density relay body.

Further, a lead seal is provided in the housing of the gas density relay body, and the connecting line of the temperature transducer is connected to the intelligent control unit through the lead seal.

More preferably, the pressure sensor includes but is not limited to a relative pressure sensor and/or an absolute pressure sensor.

Further, when the pressure sensor is an absolute pressure sensor, it is expressed by the absolute pressure value, the check result is the corresponding absolute pressure value of 20° C., expressed by the relative pressure value, and the check result is converted into the corresponding relative pressure value of 20° C.; when the pressure sensor is a relative pressure sensor, it is expressed by the relative pressure value, the check result is the corresponding relative pressure value of 20° C., expressed by the absolute pressure value, and the check result is converted into the corresponding absolute pressure value of 20° C.; the conversion relationship between the absolute pressure value and the relative pressure value is:

$$P_{absolute\ pressure} = P_{relative\ pressure} + P_{standard\ atmospheric\ pressure}.$$

Further, the pressure sensor may be a diffusion silicon pressure sensor, an MEMS pressure sensor, a chip pressure sensor, a coil induction pressure sensor (such as a pressure sensor where a Bourdon tube is attached with an induction coil), a resistance pressure sensor (such as a pressure sensor where a Bourdon tube is attached with a slide wire resistance), an analog pressure sensor and a digital pressure sensor.

Preferably, the gas density relay or monitoring device comprises at least two gas density sensors, each comprising a pressure sensor and a temperature transducer; the gas density values detected by each gas density sensor are compared to complete the mutual check of each gas density sensor.

Preferably, the gas density detection sensor comprises at least two pressure sensors, and pressure values collected by the pressure sensors are compared to complete mutual check on the pressure sensors.

Preferably, the gas density detection sensor comprises at least two temperature transducers, and temperature values collected by the temperature transducers are compared to complete mutual check on the temperature transducers.

Preferably, the gas density sensor comprises at least one pressure sensor and at least one temperature transducer; the pressure value collected by each pressure sensor and the temperature value collected by each temperature transducer are randomly arranged and combined, and each combination is converted into multiple pressure values corresponding to 20° C. according to the gas pressure temperature characteristics, that is, the gas density value. Each gas density value is compared to complete the mutual check of each pressure sensor and each temperature transducer; alternatively, the pressure value collected by each pressure sensor and the temperature value collected by each temperature transducer are all arranged and combined, and each combination is converted into multiple pressure values corresponding to 20° C. according to the gas pressure temperature characteristics, that is, the gas density value. Each gas density value is compared to complete the mutual check of each pressure sensor and each temperature transducer; alternatively, the multiple gas density values obtained by each pressure sensor and temperature transducer are compared with the output signal of the gas density relay, to complete the mutual check of the gas density relay, pressure sensor and temperature transducer; alternatively, the multiple gas density values, pressure values and temperature values obtained by each pressure sensor and temperature transducer are compared to complete the mutual check of the gas density relay, pressure sensor and temperature transducer.

Preferably, the online check contact signal sampling unit and the intelligent control unit are arranged together.

More preferably, the online check contact signal sampling unit and the intelligent control unit are sealed in a cavity or housing.

Preferably, the pressure regulating mechanism are sealed in a cavity or a housing.

Preferably, during check, the pressure regulating mechanism is the sealed air chamber, and the heating element, and/or refrigeration element are provided inside or outside the sealed air chamber; heating through the heating element and/or refrigerating through the refrigeration element cause a gas temperature change in the sealed air chamber, and further completes the pressure rise and fall of gas density relay.

More preferably, the heating element and/or the refrigeration element are semiconductors.

More preferably, the pressure regulating mechanism also comprises a heat insulation element installed outside the sealed air chamber.

Preferably, during check, the pressure regulating mechanism is a cavity with an opening at one end, and the other end of the cavity is connected with the gas density relay body; a piston is set in the cavity. One end of the piston is connected with a regulating rod. The outer end of the regulating rod is connected with a drive part. The other end of the piston stretches into the opening and contacts with the inner wall of the cavity in a sealed manner. The drive part drives the regulating rod and further drives the piston moves in the cavity.

Preferably, during check, the pressure regulating mechanism is the sealed air chamber, the heating element, and/or refrigeration element are provided inside or outside the sealed air chamber, the hermetically sealed contacts exist between the piston and the inner wall of sealed air chamber, and the drive part is provided outside the sealed air chamber, and pushes the piston to move inside the cavity through the electromagnetic force.

Preferably, the pressure regulating mechanism is an airbag with one end connected to the drive part, the airbag changes in volume under the drive of the drive part, and the airbag is connected with the gas density relay body.

Preferably, the pressure regulating mechanism is a bellows, one end of the bellows is connected with the gas density relay body, and the other end of the bellows is retractable under the drive of the drive part.

The drive part in the pressure regulating mechanism induces but is not limited to one of magnetic force, a motor (inverter motor or stepping motor), a reciprocating motion mechanism, a Carnot cycle mechanism and a pneumatic element.

Preferably, the pressure regulating mechanism is a deflation valve.

More preferably, the pressure regulating mechanism further comprises a flow valve for controlling the gas release flow.

More preferably, the deflation valve is a solenoid valve or a valve with electrically motorized operation, or other deflation valves that are realized electrically or pneumatically.

Preferably, the pressure regulating mechanism is a compressor.

Preferably, the pressure regulating mechanism is a pump; the pump includes, but is not limited to, a pressure pump, a booster pump, an electrical gas pump and an electromagnetic gas pump.

Preferably, the valve is a valve with electrically motorized operation; or a solenoid valve; or a permanent magnet solenoid valve; or a piezoelectric valve with electrically motorized operation; or a temperature-controlled valve; or a novel valve made of intelligent memory material and opened or closed by electric heating.

Preferably, the valve is closed or opened in a hose bending or clamping manner.

Preferably, the valve is sealed in a cavity or housing.

Preferably, the valve and the pressure regulating mechanism are sealed in a cavity or a housing.

Preferably, both sides of the gas path of the valve are respectively provided with pressure sensors.

Preferably, the electrical equipment includes SF6 gas electrical equipment, SF6 mixed gas electrical equipment, environmental protection gas electrical equipment, or other insulating gas electrical equipment. Specifically, electrical equipment comprises a GIS, a GIL, a PASS, a circuit breaker, a current transformer, a voltage transformer, a transformer, a cubicle-type gas insulated switchgear and a ring main unit.

Preferably, the valve is connected with the electrical equipment through an electrical equipment connecting joint.

Preferably, the contact signal sampling of the gas density relay body by the online check contact signal sampling unit shall meet the following requirements: The online check contact signal sampling unit has at least two groups of independent sampling contacts, can automatically complete the check of at least two contacts at the same time, and can continuously measure without replacing contacts or reselecting contacts; the contact includes, but is not limited to, an alarm contact, an alarm contact+a blocking contact, an alarm contact+a blocking 1 contact+a blocking 2 contact, and an alarm contact+a blocking contact+an overpressure contact.

Preferably, the testing voltage of the online check contact signal sampling unit for contact signal operating values or switching values of the gas density relay body is not lower than 24V, namely, voltage not lower than 24V is applied between corresponding terminals of contact signals during check.

A contact of the gas density relay is a normally-open density relay, the online check contact signal sampling unit includes a first connecting circuit and a second connecting circuit, the first connecting circuit is connected with the contact of the gas density relay and a contact signal control loop, and the second connecting circuit is connected with the contact of the gas density relay and the intelligent control unit; under a non-check state, the second connecting circuit is open or isolated, and the first connecting circuit is closed; under a check state, the online check contact signal sampling unit cuts off the first connecting circuit, connects the second connecting circuit, and connects the contact of the gas density relay with the intelligent control unit; alternatively, a contact of the gas density relay is a normally-closed density relay, the online check contact signal sampling unit includes the first connecting circuit and the second connecting circuit, the first connecting circuit is connected with the contact of the gas density relay and the contact signal control loop, and the second connecting circuit is connected with the contact of the gas density relay and the intelligent control unit; under the non-check state, the second connecting circuit is open or isolated, and the first connecting circuit is closed; under the check state, the online check contact signal sampling unit closes the contact signal control loop, cuts off the connection between the contact of the gas density relay and the contact signal control loop, connects the second connecting circuit, and connects the contact of the gas density relay with the intelligent control unit.

Preferably, the intelligent control unit acquires gas density values collected by the gas density detection sensor; alternatively, the intelligent control unit acquires pressure values and temperature values collected by the gas density detection sensor, so that the gas density is online monitored by the gas density relay, namely, the gas density of the monitored electrical equipment is online monitored by the gas density relay.

More preferably, the intelligent control unit calculates the gas density value by an averaging method (mean value method), wherein the averaging method is: in a set time interval, the collection frequency is set, and average calculation is carried out on all the N gas density values at different time points, so as to obtain the gas density value; alternatively, in a set time interval, a temperature interval step is set, and the average density values corresponding to N different temperature values collected in all temperature ranges are calculated to obtain the gas density value; alternatively, in a set time interval, a pressure interval step is set, and the average density values corresponding to N different pressure values collected in all pressure variation ranges are calculated to obtain the gas density value; N is a positive integer greater than or equal to 1.

Preferably, the intelligent control unit acquires the gas density value collected by the gas density sensor when the contact signal of the gas density relay body acts or switches, and completes the online check of the gas density relay; alternatively, the intelligent control unit acquires the pressure value and temperature value collected by the gas density sensor when the contact signal of the gas density relay body acts or switches, and converts them into the pressure value corresponding to 20° C. according to the gas pressure-temperature characteristics, that is, the gas density value, and completes the online check of the gas density relay.

Preferably, based on an embedded algorithm and control program of an embedded system of a microprocessor, the intelligent control unit automatically controls the whole check process, including all peripherals, logic, input and output.

More preferably, based on embedded algorithms and control programs of a general computer, an industrial control computer, an ARM chip, an AI chip, a CPU, an MCU, an FPGA, a PLC, an industrial control main board, an embedded master control board and the like, the intelligent control unit automatically controls the whole check process, including all peripherals, logic, input and output.

Preferably, the intelligent control unit is provided with an electrical interface, which completes test data storage, and/or test data export, and/or test data printing, and/or data communication with an upper computer, and/or analog and digital information input.

More preferably, the gas density relay or monitoring device with online self-check function supports the input of basic information of the gas density relay. The basic information includes, but is not limited to, one or several types of factory number, precision requirement, rated parameter, Manufacturer and operating position.

Preferably, the intelligent control unit is further provided with a clock, and the clock is configured to regularly set the check time of the gas density relay, or record test time, or record event time.

Preferably, the circuit of the intelligent control unit includes an intelligent control unit protection circuit, which includes, but is not limited to, one or several types of anti-static interference circuit (such as ESD and EMI), anti-surge circuit, electric quick protection circuit, anti-RF field interference circuit, anti-pulse group interference circuit, power supply short-circuit protection circuit, power supply reverse connection protection circuit, electric contact misconnection protection circuit and charging protection circuit.

Preferably, the gas density relay or monitoring device with online self-check function further comprises a multi-channel joint, and the gas density relay body, the valve and the pressure regulating mechanism are arranged on the multichannel joint; alternatively, the valve and the pressure regulating mechanism are arranged on the multichannel joint; alternatively, the gas density relay body, the gas density sensor, the valve and the pressure regulating mechanism are arranged on the multichannel joint.

More preferably, the gas density relay or monitoring device with online self-check function further comprises a first connecting pipe, and the gas path of the pressure regulating mechanism is connected with the gas density relay body through the first connecting pipe; the first interface of the multichannel joint is connected to the position of the first connecting pipe between the gas density relay body and the pressure regulating mechanism.

More preferably, the valve is communicated with a second interface of the multichannel joint, and communicated with the gas density relay body through the multichannel joint.

More preferably, the interface for communicating the valve with the electrical equipment is communicated with the first interface of the multichannel joint; the gas density relay body is communicated with the multichannel joint through the valve; the second interface of the multichannel joint is used for connecting the electrical equipment.

More preferably, the temperature transducer is communicated with the gas path of the multichannel joint or communicated with a third interface of the multichannel joint.

Preferably, the gas density relay with online self-check function further comprises a self-sealing valve, wherein the self-sealing valve is installed between the electrical equipment and the valve; alternatively, the valve is installed between the electrical equipment and the self-sealing valve.

Preferably, the gas density relay or monitoring device with online self-check function further comprises an air admission interface; the air admission interface is arranged on the pressure regulating mechanism; alternatively, the air admission interface is arranged on the electrical equipment; alternatively, the air admission interface is arranged between the electrical equipment and the valve; alternatively, the air admission interface is arranged on a second connecting pipe, wherein the second connecting pipe is connected with the gas path of the valve and the pressure regulating mechanism; alternatively, the second connecting pipe is connected with the valve and the gas density relay body.

Preferably, the gas density relay or monitoring device with online self-check function further comprises a display interface for HMI, which is connected with the intelligent control unit to display the current check data in real time and/or support data input.

Preferably, the gas density relay or monitoring device with online self-check function further comprises a moisture sensor, wherein the moisture sensor is respectively connected with the gas density relay body and the intelligent control unit.

More preferably, the gas density relay or monitoring device with online self-check function further comprises a gas circulation mechanism, wherein the gas circulation mechanism is respectively connected with the gas density relay body and the intelligent control unit; and the gas circulation mechanism comprises a capillary tube, a sealed compartment and a heating element.

Further, the micro-water sensors may be mounted in the seal chamber and the capillary tube of the gas circulation mechanism, at an orifice of the capillary tube or outside the capillary tube.

Preferably, the gas density relay or monitoring device with online self-check function further comprises a decomposition product sensor, wherein the decomposition product sensor is respectively connected with the gas density relay body and the intelligent control unit.

Preferably, the gas density relay or monitoring device with online self-check function further comprises a camera for monitoring.

Preferably, the gas density relay or monitoring device with online self-check function further comprises background monitoring terminal, and the gas density relay or monitoring device can realize remote communication with the background monitoring terminal through communication equipment; the communication equipment is used to realize the data transmission between the gas density relay or monitoring device and the background monitoring terminal.

More preferably, the background monitoring terminal includes a storage device for storing data and/or information transmitted to the background monitoring terminal through the communication equipment.

More preferably, the background monitoring terminal includes a display interface for HMI, to display the current check data in real time and/or support data input. Specifically, the display includes real-time online gas density value display, pressure value display, temperature value display, change trend analysis, historical data query, real-time alarm, etc.

More preferably, the communication equipment is arranged at the housing of the gas density relay or monitoring device, or at the housing of the intelligent control unit; alternatively, the communication equipment and the intelligent control unit are in an integrated structure.

More preferably, the communication mode of the communication equipment is wire communication or wireless communication.

Further, the wire communication mode includes but is not limited to one or more of an RS232 bus, an RS485 bus, a CAN-BUS bus, 4-20 mA, Hart, IIC, SPI, Wire, a coaxial cable, a PLC and a cable.

Further, the wireless communication mode includes, but is not limited to, one or several types of built-in 5G/NB-IOT communication module of sensor (such as 5G, NB-IOT), 2G/3G/4G/5G, WIFI, Bluetooth, Lora, Lorawan, Zigbee, infrared, ultrasonic wave, acoustic wave, satellite, light wave, quantum communication and sonar.

More preferably, the intelligent control unit is controlled by field control and/or by the background monitoring terminal.

Further, the gas density relay or monitoring device with online self-check function completes the online check of the gas density relay according to the setting of the background monitoring terminal or the remote control instruction; alternatively, the online check of the gas density relay is completed according to the set check time of the gas density relay.

More preferably, the gas density relay or monitoring device with online self-check function further comprises a shield which can shield electric field and/or magnetic field, wherein the shield is arranged on the intelligent control unit and/or the communication equipment.

The shield uses the reflection and/or absorption of shielding materials to reduce EMI radiation. The addition of shielding materials can effectively reduce or clear unnecessary gaps, inhibit electromagnetic coupling radiation and reduce electromagnetic leakage and interference. Materials with high conductivity and magnetic conductivity can be used as electromagnetic shielding materials (such as iron). Generally, the shielding performance is required to reach 40-60 dB. Specifically, the circuit control part can be well sealed in a housing made of shielding materials, which can overcome the interference problem caused by electromagnetic leakage due to the conductive discontinuity of the gap.

More preferably, the gas density relay body is provided with a comparison density value output signal which is connected with the intelligent control unit; alternatively, the gas density relay body is provided with a comparison pressure value output signal which is connected with the intelligent control unit.

Further, when the gas density relay body outputs the output signal of the comparison density value, the intelligent control unit collects the current gas density value for comparison and checks the comparison density value of the gas density relay body, while the intelligent control unit and/or the background monitoring terminal compares the results for determination and gives an anomaly prompt if the error is out of tolerance; alternatively, When the gas density relay body outputs the output signal of the comparison density value, the intelligent control unit collects the current gas density value for comparison and mutually checks the gas density relay body and the gas density sensor, while the intelligent control unit and/or the background monitoring terminal compares the results for determination and gives an anomaly prompt if the error is out of tolerance; alternatively, When the gas density relay body outputs the output signal of the comparison pressure value, the intelligent control unit collects the current pressure value for comparison and mutually checks the gas density relay body and the gas density sensor, while the intelligent control unit and/or the background monitoring terminal compares the results for determination and gives an anomaly prompt if the error is out of tolerance.

More preferably, at least two of the gas density relay or monitoring device with online self-check function are connected with the background monitoring terminal through a hub and a protocol converter in turn; each gas density relay or monitoring device is set onto corresponding electrical equipment respectively.

Further, the hub is RS485 hub.

Further, the protocol converter is IEC61850 or IEC104 protocol converter.

More preferably, the protocol converter is also connected with a network service printer and a network data router respectively.

In the above contents, the gas density relay with the online self-check function generally refers to the composition elements thereof being designed to an integrated structure, and the gas density monitoring device generally refers to the composition elements thereof being designed to a split structure, with flexible composition.

In the second aspect, the present application provides a gas density relay check method, which includes:
in a normal working state, the gas density relay monitors the gas density value in the electrical equipment;
According to the set check time and gas density value, and under the condition that the check of the gas density relay is permitted, the gas density relay:
The valve is closed via the intelligent control unit;
The pressure regulating mechanism is driven by the intelligent control unit to slowly decrease the gas pressure and enable the contact action of the gas density relay body. The contact action is transmitted to the intelligent control unit through the online check contact signal sampling unit. The intelligent control unit obtains the gas density value according to the pressure value and temperature value during the contact action, or directly obtains the gas density value, detects the contact signal operating value of the gas density relay body, and completes the check of the contact signal operating value of the gas density relay;
When all the check of contact signals is completed, the intelligent control unit opens the valve.

Preferably, the gas density relay check method includes:
in a normal working state, the gas density relay monitors the gas density value in the electrical equipment, and at the same time, the gas density relay monitors the gas density value in the electrical equipment online via a gas density detection sensor and the intelligent control unit;
According to the set check time and gas density value, and under the condition that the check of the gas density relay is permitted, the gas density relay:
The valve is closed via the intelligent control unit;
The online check contact signal sampling unit is adjusted to the check state by the intelligent control unit. In the check state, the online check contact signal sampling unit cuts off the contact signal control loop of the gas density relay body and connects the contact of the gas density relay body to the intelligent control unit;
The pressure regulating mechanism is driven by the intelligent control unit to slowly decrease the gas pressure and enable the contact action of the gas density relay body. The contact action is transmitted to the intelligent control unit through the online check contact signal sampling unit. The intelligent control unit obtains the gas density value according to the pressure value and temperature value during the contact action, or directly obtains the gas density value, detects the contact signal operating value of the gas density relay body, and completes the check of the contact signal operating value of the gas density relay;
The pressure regulating mechanism is driven by the intelligent control unit to slowly increase the gas pressure and enable the contact reset of the gas density relay. The contact reset is transmitted to the intelligent control unit through the online check contact signal sampling unit. The intelligent control unit obtains the gas density value according to the pressure value and temperature value during the contact reset, or directly obtains the gas density value, detects the contact signal return value of the gas density relay body, and completes the check of the contact signal return value of the gas density relay;

When all the check of contact signals is completed, the intelligent control unit opens the valve and adjusts the online check contact signal sampling unit to the working state, and the contact signal control loop of the gas density relay body returns to the normal operation state.

Preferably, the contact signals include alarm signals and/or blocking signals.

Preferably, the gas density detection sensor includes at least one pressure sensor and at least one temperature transducer; alternatively, the gas density detection sensor is the gas density transmitter comprising the pressure sensors and the temperature transducers; alternatively, the gas density detection sensor is a density detection sensor adopting a quartz tuning fork technology.

Preferably, the gas density relay can send alarm automatically in case of abnormality upon completion of check, and upload to remote or send to designated receiver.

Preferably, the check method further comprises: displaying gas density values and check results on the spot or displaying gas density values and check results through a background monitoring terminal.

Preferably, the check method also includes the field control and/or background monitoring terminal control of the intelligent control unit.

The third aspect of the application provides a method for reforming a gas density relay, comprising:

The gas density detection sensor is communicated with the gas density relay body;

Connecting the gas path of the gas density relay body with the first interface of the multichannel joint;

Connecting the gas path of the pressure regulating mechanism with the second interface of the multichannel joint, wherein the first interface is connected with the second interface, so that the gas path of the pressure regulating mechanism is connected with the gas density relay body; the pressure regulating mechanism controls the pressure rise and fall of the gas density relay body, to enable the contact signal action of the gas density relay body;

Directly or indirectly connecting the online check contact signal sampling unit with the gas density relay body, wherein the online check contact signal sampling unit samples the contact signal of the gas density relay body at ambient temperature;

Respectively connecting the intelligent control unit with the gas density sensor, the pressure regulating mechanism and the online check contact signal sampling unit to complete the control of the pressure regulating mechanism, the acquisition of pressure value and temperature value, and/or the acquisition of gas density value, and detect the contact signal operating value and/or contact signal return value of the gas density relay body;

The contact signals include alarm signals and/or blocking signals.

Preferably, the method for reforming a gas density relay further comprises:

Connecting one end of the valve with electrical equipment, and the other end of the valve with the pressure regulating mechanism and the gas density relay body;

Further connecting the valve with the intelligent control unit so that the valve can be closed or opened under the control of the intelligent control unit.

More preferably, the gas density relay modification method further includes: the self-sealing valve is mounted between the multichannel joint and the valve; alternatively, the valve is mounted between the multichannel joint and the self-sealing valve.

Compared with the prior art, the technical scheme of the invention has the following advantages:

The application provides a gas density relay with online self-check function and its check method for high-voltage and medium-voltage electrical equipment, including a gas density relay body, a gas density sensor, a pressure regulating mechanism, a valve, an online check contact signal sampling unit and an intelligent control unit. The valve is closed through the intelligent control unit so that the gas density relay body is isolated from the electrical equipment in the gas path; the pressure regulating mechanism is used to increase and decrease the pressure, so that the gas density relay body can have contact action, and the contact action is transmitted to the intelligent control unit through the online check contact signal sampling unit, and the intelligent control unit detects the alarm and/or blocking contact signal operating value and/or return value of the gas density relay body according to the density value of the contact action. In the application, the communication equipment can also remotely communicate with the background monitoring terminal, and the check of the gas density relay can be completed without maintenance personnel on site, thus improving the reliability of power grid and efficiency and reducing the cost. In the application, the intelligent control unit can also perform mutual self-check between the gas density relay body and the gas density sensor, thus realizing maintenance-free gas density relay with online self-check function. Meanwhile, the whole check process of the invention can achieve zero emission of SF6 gas and meet the requirements of environmental protection regulations.

BRIEF DESCRIPTION OF THE DRAWINGS

Drawings for constituting a part of the present application are used to provide further understanding of the present application, and exemplary embodiments of the present application and descriptions thereof are used to explain the present application, and do not constitute improper limitation to the present application. In the drawings.

DETAILED DESCRIPTION OF THE EMBODIMENTS

In order to make the purpose, the technical scheme and the advantages of the invention more clear and definite, the invention is further elaborated hereafter with reference to the drawings and examples. It should be understood that the specific embodiments described herein are only used to explain the invention, and cannot play a role in limiting the invention.

Embodiment I

Figure 1:
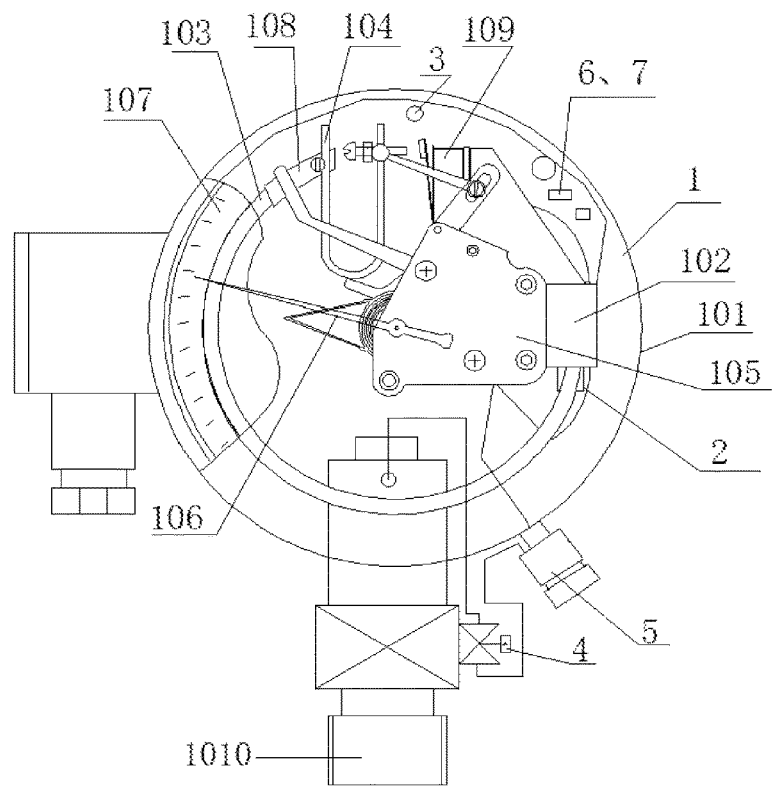
FIG. 1 is a structural schematic diagram of the gas density relay or monitoring device in Embodiment 1.

As shown in FIG. 1, a gas density relay or monitoring device with online check function consists of gas density relay body 1. The gas density relay body 1 consists of housing 101 as well as base 102, end base 108, pressure detector 103, temperature compensation element 104, several signal generators 109, movement 105, pointer 106 and dial 107 in the housing 101. One end of the pressure detector 103 is fixed on the base 102 and connected with it, while the other end of the pressure detector 103 is connected with one end of the temperature compensation element 104 through the end base 108. The other end of the temperature compensation element 104 is equipped with a cross beam on which a regulating part is installed to drive the signal generator 109 and make the contact of the signal generator 109 is connected or disconnected. The movement 105 is fixed onto the base 102; the other end of the temperature compensation element 104 is connected with the movement 105 through a connecting rod or directly connected with the movement 105; the pointer 106 is mounted on the movement 105 and arranged in the front of the dial 107, and the pointer 106 and the dial 107 display gas density values. The gas density relay body 1 may further include a digital device or liquid crystal device with an indicating value display function.

In addition, the gas density relay or monitoring device with online check function also consists of pressure sensor 2, temperature transducer 3, valve 4, pressure regulating mechanism 5, online check contact signal sampling unit 6, and intelligent control unit 7. One end of the valve 4 is connected to a piece of electrical equipment in the form of packing joint through the electrical equipment connecting joint 1010, while the other end of the valve 4 is connected with the base 102. The pressure sensor 2 is connected with the pressure detector 103 through gas path. The pressure regulating mechanism 5 is connected with the pressure detector 103. The online check contact signal sampling unit 6 is connected with the signal generator 109 and the intelligent control unit 7. The valve 4 and the pressure regulating mechanism 5 are also connected to the intelligent control unit 7, respectively.

The signal generator 109 consists of microswitch or magnetically assisted electric contact. The gas density relay body 1 outputs contact signals through the signal generator 109. The pressure detector 103 consists of Bourdon tube or bellows. The temperature compensation element 104 uses a temperature compensation strip or gas closed in the housing. The gas density relay of the present application may further include: an oil-filled density relay, an oil-free density relay, a gas density meter, a gas density switch or a gas pressure meter.

In the gas density relay in Embodiment 1, the changing pressure and temperature are corrected through the pressure detector 103 and the temperature compensation element 104 so as to reflect the change of SF6 gas density. Namely, under the pressure action of sulfur hexafluoride (SF6) as a measured medium, owing to the action of the temperature compensation element 104, when the gas density value of sulfur hexafluoride changes, the pressure value of the sulfur hexafluoride gas correspondingly changes to force the tail end of the pressure detector 103 to generate corresponding elastic deformation displacement, which is transmitted to the movement 105 via the temperature compensation element 104 and then transmitted to the pointer 106 via the movement 105, so that the gas density value of the measured sulfur hexafluoride is indicated on the dial 107. The signal generators 109 serve as output alarm blocking contacts. Therefore, the gas density relay body 1 can display the gas density value of the sulfur hexafluoride. In case of gas leakage and reduction of the gas density value of the sulfur hexafluoride, the pressure detector 103 generates regulating downward displacement, which is transmitted to the movement 105 via the temperature compensation element 104 and then transmitted to the pointer 106 via the movement 105, the pointer 106 moves towards small indicating values, and the degree of gas leakage is displayed on the dial 107 specifically; at the same time, the pressure detector 103 drives the beam to displace downwards via the temperature compensation element 104, a regulating part on the beam drifts away from the signal generators 109 to a certain degree, contacts of the signal generators 109 are connected to transmit corresponding contact signals (alarm or blocking) and accordingly monitor and control the gas density of the sulfur hexafluoride in the equipment such as an electrical switch, and then the electrical equipment can work safely.

If the gas density value rises, that is when the pressure value of SF6 gas in the sealed air chamber is greater than the set pressure value of SF6 gas, the pressure value also increases, the end of the pressure detector 103 and the temperature compensation element 104 generate the corresponding upward displacement. The temperature compensation element 104 makes the cross beam also move upward.

The regulating part on the cross beam moves upward and drives the contact of the signal generator 109 to be disconnected. Then, the contact signal is released.

In the above embodiment, the value 4 may be diversified, and block valve may be used, such as ball valve, butterfly valve, gate valve, globe valve, plug valve, needle valve and diaphragm valve. If it is a ball valve, the ball valve can be driven to close the air passage of the switchgear by rotating the self-sealing valve element. It may be designed flexibly according to actual requirements. The valve 4 may be checked in an automatic, manual and semi-manual manner.

The type of the pressure sensor 2 may be an absolute pressure sensor, a relative pressure sensor, or the absolute pressure sensor or the relative pressure sensor, and there may be a plurality of the absolute pressure sensors or the relative pressure sensors. The pressure sensor may be a diffused silicon pressure sensor, MEMS pressure sensor, chip pressure sensor, coil-induced pressure sensor (such as pressure measurement sensor of Bourdon tube with induction coil), or resistance pressure sensor (such as pressure measurement sensor of Bourdon tube with slide wire resistance). It may be an analog quantity pressure sensor or a digital quantity pressure sensor. The pressure is collected via the pressure sensor, the pressure transmitter and various pressure sensing elements, such as the diffusion silicon type, sapphire type, piezoelectric type and strain gauge type (resistance strain gauge type and ceramic strain gauge type).

The temperature transducer 3 can be a thermocouple, a thermistor or a semiconductor sensor. It may be a contact/non-contact sensor. It may be a thermal resistance and thermocouple. In short, the temperature transducer, the temperature transmitter and various temperature sensing elements can be used for the temperature collection.

The online check contact signal sampling unit 6 mainly completes the contact signal sampling of the gas density relay body 1. The basic requirements or functions of the online check contact signal sampling unit 6 are as below: 1) The safe operation of electrical equipment is not affected during check. In other words, when the contact signal of the gas density relay body 1 acts, the safe operation of electrical equipment will not be affected in the check process; 2) The contact signal control loop of the gas density delay body 1 does not affect the performance of the gas density relay body, especially the performance of the intelligent control unit 7. It will neither damage the gas density relay nor affect the test.

The basic requirements or functions of the intelligent control unit 7 are as below: The intelligent control unit 7 is used to control the valve 4 and the pressure regulating mechanism 5, and acquire signals. Realize: when the contact signal of the gas density relay body 1 acts, the pressure value and the temperature value can be detected, then converted into the corresponding pressure value $P_{20}$ (density value) at 20° C., that is, the contact operating value $P_{D20}$ of the gas density relay body 1 can be detected, so as to complete the check of the gas density relay body 1. Alternatively, it can directly detect the density value $P_{D20}$ when the contact signal of the gas density relay body 1 acts, and complete the check of the gas density relay body 1. Meanwhile, it can complete the self-check among the gas density relay body 1, the pressure sensor 2 and the temperature transducer 3 by testing the rated pressure value of the gas density relay body 1 to achieve maintenance-free. Of course, the intelligent control unit 7 may further realize the followings: storing test data; and/or exporting the test data; and/or printing the test data; and/or performing data communication with an upper computer; and/or inputting information of an analog quantity and a digital quantity. The intelligent control unit 7 also consists of a communication module through which long-distance transmission of test data and/or check results can be achieved. When the rated pressure value of the gas density relay body 1 outputs the signal, the intelligent control unit 7 collects the density value at the same time and completes the check of the rated pressure value of the gas density relay body 1.

The electrical equipment includes SF6 gas electrical equipment, SF6 mixed gas electrical equipment, environmental protection gas electrical equipment, or other insulating gas electrical equipment. Specifically, the electrical equipment includes GIS, GIL, PASS, a circuit breaker, a current transformer, a voltage transformer, a transformer, an inflatable cabinet and a ring main unit, etc.

The gas density relay body 1, pressure sensor 2, temperature transducer 3, valve 4, pressure regulating mechanism 5, online check contact signal sampling unit 6, intelligent control unit 7 and multichannel joint 9 can be set flexibly as required. For example, the gas density relay body 1, the pressure sensor 2 and the temperature transducer 3 can be set together. Or the valve 4 and the pressure regulating mechanism 5 can be set together. In one word, the positions of the gas density relay body 1, the gas density sensor, the pressure regulating mechanism 5, the valve 4, the online check contact signal sampling unit 6 and the intelligent control unit 7 can be flexibly set as required.

The check and monitoring working principles of the gas density relay or monitoring device in the embodiment are as below:

The intelligent control unit 7 monitors the gas pressure P and temperature T of the electrical equipment with pressure sensor 2 and temperature transducer 3, and obtains the pressure value $P_{20}$ (i.e. gas density value) under the corresponding temperature of 20° C. When the gas density relay body 1 needs to be checked, if the gas density value $P_{20}$ is equal to or greater than the set safety check density value $P_s$, the gas density relay gives instructions, that is the valve 4 is closed through the intelligent control unit 7 so that the gas density relay body 1 is disconnected with the electrical equipment on the gas path. Then, the intelligent control unit 7 disconnects the control loop of the gas density relay body 1 so that the safe operation of the electrical equipment will not be affected during the online check of the gas density relay body 1, and false alarm signal or control loop blocking will not happen during check. Before verifying the gas density relay, it has monitored and judged that the gas density value $P_{20}$ is greater than or equal to the setting safety check density value, the gas of the electrical equipment is the range of the safe operation, in addition, the gas leakage is a slow process, so the electrical equipment is safe during check. Besides, the intelligent control unit 7 is connected with the contact sampling circuit of the gas density relay body 1. Then, the intelligent control unit 7 controls the drive part 52 (it can be realized through motor and gear. The methods are diversified and flexible) of the pressure regulating mechanism 5 so that the volume of the seal cavity composed of the pressure regulating mechanism 5, the gas density relay body 1 and the valve 4 changes. Since the gas pressure of the gas density relay body 1 gradually drops, the contact of the gas density relay body 1 acts, and the contact action is uploaded to the intelligent control unit 7 through the online check contact signal sampling unit 6. According to the pressure value (it is converted to the corresponding pressure value $P_{20}$ (density value) at 20° C. according to the gas characteristics) and temperature value measured during contact action, the intelligent control unit 7 can detect the contact action value $P_{D20}$ of the gas density relay body 1. After all the contact action values of alarm and/or blocking signal of the gas density relay body 1 are detected, the drive part 52 of the pressure regulating mechanism 5 is controlled through the intelligent control unit 7 so that the gas pressure of the gas density relay body 1 rises gradually until the return value of the alarm and/or blocking contact signal of the gas density relay body 1 is detected. After verifying for many times (such as 2-3 times), the average value is calculated, thus the check of the gas density relay body 1 is completed. Then, the intelligent control unit 7 disconnects the contact sampling circuit of the gas density relay body 1. At this moment, the contact of the gas density relay body 1 is not connected with the intelligent control unit 7. At the same time, the valve 4 is opened through the intelligent control unit 7 so that the gas density relay body 1 is connected with the electrical equipment on the gas path. The control loop of the gas density relay body 1 is connected through the intelligent control unit 7. The density monitoring circuit of the gas density relay body 1 operates normally. The gas density relay body 1 monitors the gas density of the electrical equipment so that the electrical equipment can work reliably and safely. Thus, the online check of the gas density relay body 1 is conveniently completed, at the same time, the safe operation of the electrical equipment is not affected during the online check of the gas density relay body 1.

When the gas density relay body 1 completes check, the gas density relay makes a decision and announces the test result. The mode is flexible: 1) The gas density relay can give an announcement locally, e.g. display through the indicator light, digital or liquid crystal; 2) or the gas density relay can upload the result through online remote communication, e.g. the test can be uploaded to the background of the online monitoring system; 3) or the result can be wirelessly uploaded to a special terminal, such as mobile phone; 4) or the result can be uploaded through other approaches; 5) or the anomaly can be uploaded through alarm signal or special signal; 6) the result can be uploaded alone or together with other signals. In conclusion, after the gas density relay body 1 completes check, it can automatically give an alarm to a remote terminal or to the specified receiver (such as mobile phone) in case of any anomaly. Alternatively, after the gas density relay body 1 completes check, in case of any anomaly, the intelligent control unit 7 can upload the alarm contact signal of the gas density relay body 1 to the remote end (monitoring room and background monitoring platform, etc.) and display the announcement locally. For the online check of the simple gas density relay, the abnormal check result can be uploaded via the alarm signal line. The abnormal check result can be uploaded regularly. If an abnormality is provided, a contact is connected to the alarm signal contact in parallel to be closed and disconnected regularly, and the condition can be obtained via analysis; or abnormal check result is uploaded by the independent check signal line. To be specific, good conditions or anomalies may be uploaded. In addition, online density monitoring can be uploaded remotely, or the check result is uploaded through the separate check signal or displayed and alarmed locally. As well, it may be uploaded wirelessly and uploaded through networking with a smartphone. The communication mode may be wired or wireless. The wire communication mode may be RS232 bus, RS485 bus, CAN-BUS and other industrial buses, optical fiber Ethernet, 4-20 mA, Hart, IIC, SPI, Wire, coaxial cable and power line carrier (PLC). The wireless communication mode includes 2G/3G/4G/5G, WIFI, Bluetooth, Lora, Lorawan, Zigbee, infrared, ultrasonic wave, sound wave, satellite, optical wave, quantum communication, sonar and 5G/NB-IOT communication module (such as NB-IOT) built in the sensor. In short, it may be multiple ways and a plurality of combinations, to ensure the reliable performance of the gas density relay completely.

The gas density relay has safety protection function, that is, when the gas density value is lower than the set value, the gas density relay no longer automatically conducts online check, but gives a notice signal. For example, when the gas density value of the equipment is lower than the set value $P_s$, no check will be conducted again. Only when the gas density value of the equipment is equal to or greater than (the alarm pressure value +0.02 MPa) can online check be conducted.

The gas density relay can perform the online check according to the setting time, or perform the online check according to the setting temperature (such as extreme high temperature, high temperature, extreme low temperature, low temperature, normal temperature, 20° C., etc.). The error judgment requirements are different for online check at high temperature, low temperature, normal temperature and 20° C. ambient temperature. For example, for check at 20° C. ambient temperature, the accuracy requirements of gas density relay can be level 1.0 or 1.6, or level 2.5 at high temperature. Specifically, it can be implemented according to the temperature requirements and the related standards. For example, according to the regulations of the temperature compensation performance in article 4.8 of DL/T 259 Calibration Regulation for SF6 Gas Density Monitor, and the precision requirement corresponding to each temperature value.

The gas density relay can compare its error performance according to different temperatures and different periods. In other words, the performance of the gas density relay and the electrical equipment is determined by comparison in different periods and the same temperature range. The gas density relay has the function of comparison among previous periods and comparison between the history and the present. The gas density relay can be verified for many times (such as 2-3 times), and the average value is calculated according to each check result. If necessary, online check may be carried out to the gas density relay at any time. In addition, the gas density relay can monitor online the gas density value, and/or pressure value, and/or temperature value of electrical equipment, and upload the monitoring data to the target equipment so as to achieve online monitoring.

Embodiment II

Figure 2:
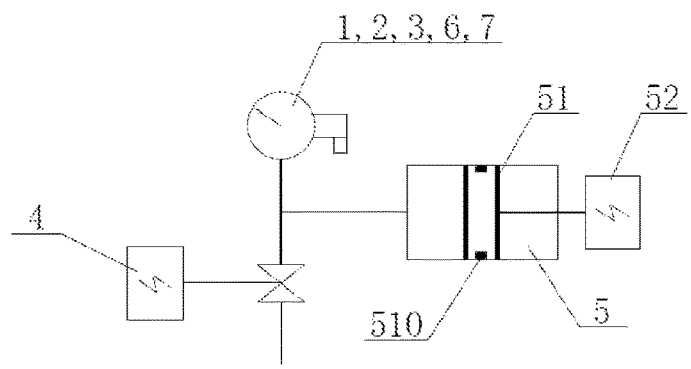
FIG. 2 is a structural schematic diagram of the gas density relay or monitoring device in Embodiment 2.

As shown in FIG. 2, a gas density relay or monitoring device with online self-check function consists of gas density relay body 1 (the gas density relay body 1 is mainly composed of housing, as well as base, pressure detector, temperature compensation element, movement, pointer, dial, end base, several signal generators and electrical equipment connecting joint in the housing), pressure sensor 2, temperature transducer 3, valve 4, pressure regulating mechanism 5, online check contact signal sampling unit 6 and intelligent control unit 7.

One end of the valve 4 is connected to the electrical equipment in the form of packing joint through the electrical equipment connecting joint 1010, while the other end of the valve 4 is connected with the base and pressure detector of the gas density relay body. The pressure sensor 2, temperature transducer 3, online check contact signal sampling unit 6 and intelligent control unit 7 are installed on or in the housing of the gas density relay body 1. The pressure sensor 2 is connected with the pressure detector of the gas density relay body 1 on the gas path. The pressure regulating mechanism 5 is connected with the pressure detector of the gas density relay body 1. The online check contact signal sampling unit 6 and intelligent control unit 7 are set together. The pressure sensor 2 and temperature transducer 3 are connected with the intelligent control unit 7. The valve 4 is connected with the intelligent control unit 7. The pressure regulating mechanism 5 is connected with the intelligent control unit 7.

Different from Embodiment 1, the pressure regulating mechanism 5 in this embodiment is a cavity with one end open. A piston 51 is set in the cavity, and the piston 51 is provided with a sealing ring 510. One end of the piston 51 is connected with a regulating rod. The outer end of the regulating rod is connected with a drive part 52. The other end of the piston 51 stretches into the opening and contacts with the inner wall of the cavity. The drive part 52 drives the regulating rod and further drives the piston 51 moves in the cavity so that the volume of the sealed part in the cavity changes, thus completing pressure rise and fall. The drive part 52 includes but is not limited to, one of a magnetic force, an electric motor (an inverter electric motor or a stepping electric motor), a reciprocating motion mechanism, a Carnot cycle mechanism, and a pneumatic element.

In an alternative preferred embodiment, the pressure regulating mechanism 5 can be a solenoid valve which is sealed in the housing. The pressure regulating mechanism 5 makes the solenoid valve open under the control of the intelligent control unit 7 so that the pressure changes to complete pressure rise and fall.

In an alternative preferred embodiment, the pressure regulating mechanism 5 can be composed of bellows and drive part 52. The bellows is connected with the pressure detector of the gas density relay body 1 by packing joint, forming a reliable seal cavity. The pressure regulating mechanism 5 makes the drive part 52 drive the bellows volume to change under the control of the intelligent control unit 7 so that the volume of the seal cavity changes, thus completing pressure rise and fall.

In an alternative preferred embodiment, the pressure regulating mechanism 5 can be composed of air chamber, heating element and heat insulation element. The air chamber is equipped with heating element on the outside (or inside). Through heating, the temperature changes to complete pressure rise and fall.

Certainly, the pressure regulating mechanism 5 may be of many other forms, not limited to the above. Other mechanisms which can achieve pressure rise and fall are also covered in the protection scope of the application.

The pressure is regulated by the pressure regulating mechanism 5 to enable the contact action of the signal generator of gas density relay body 1. The contact action is transmitted to the intelligent control unit 7 through the online check contact signal sampling unit 6. The intelligent control unit 7 detects the alarm and/or blocking contact signal operating value and/or return value of the gas density relay according to the gas density value of gas density relay body 1 at the time of contact action or the corresponding gas density value converted based on the pressure value and temperature value, thus completing the check of the gas density relay. Or as long as the alarm and/or blocking contact action value, the check of the gas density relay is completed.

Embodiment III

Figure 3:
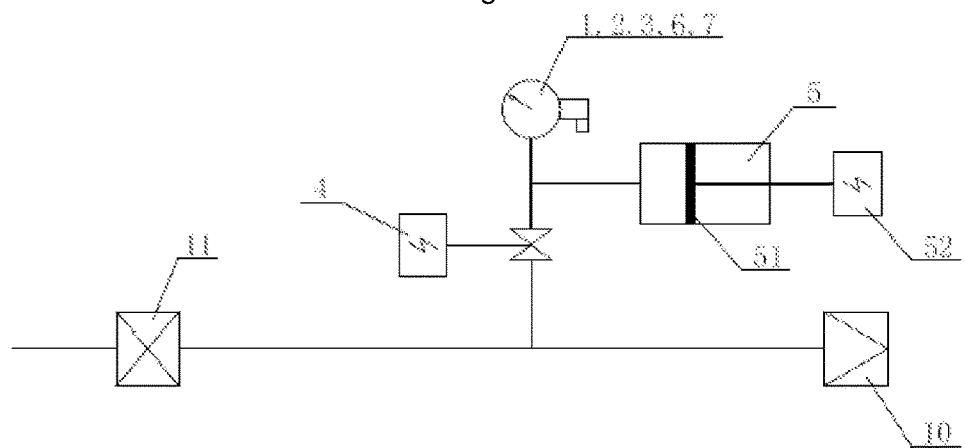
FIG. 3 is a structural schematic diagram of the gas density relay or monitoring device in Embodiment 3.

As shown in FIG. 3, compared with Embodiment 2, the air admission interface 10 and self-sealing valve 11 are added in this embodiment. One end of the self-sealing valve 11 is connected to the electrical equipment, while the other end of the self-sealing valve 11 is connected with one end of the valve 4 and the air admission interface 10 through connecting pipes.

Embodiment IV

Figure 4:
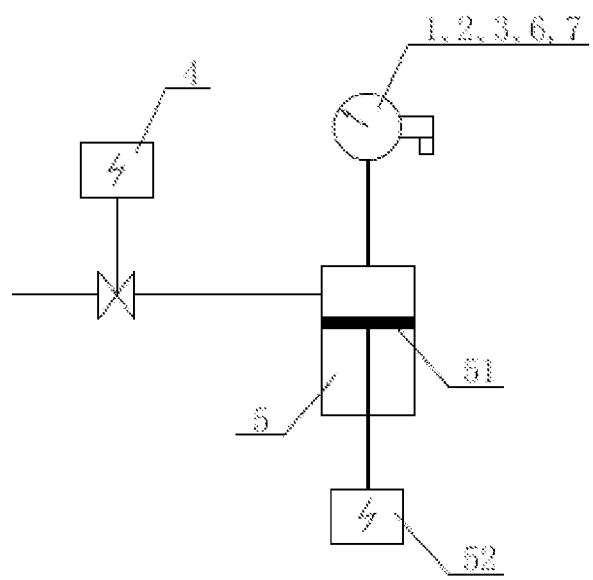
FIG. 4 is a structural schematic diagram of the gas density relay or monitoring device in Embodiment 4.

As shown in FIG. 4, a gas density relay or monitoring device with online self-check function is different from Embodiment 2 as below: the other end of the valve 4 is connected with the gas path of the pressure regulating mechanism 5 through connecting pipes so that the valve 4 is connected with the base and pressure detector of the gas density relay body 1. Certainly, the air admission interface and self-sealing valve can also be added in Embodiment 4. For instance, one end of the self-sealing valve is connected to the electrical equipment, while the other end of the self-sealing valve is connected with one end of the valve 4 and the air admission interface through connecting pipes.

Embodiment V

Figure 5:
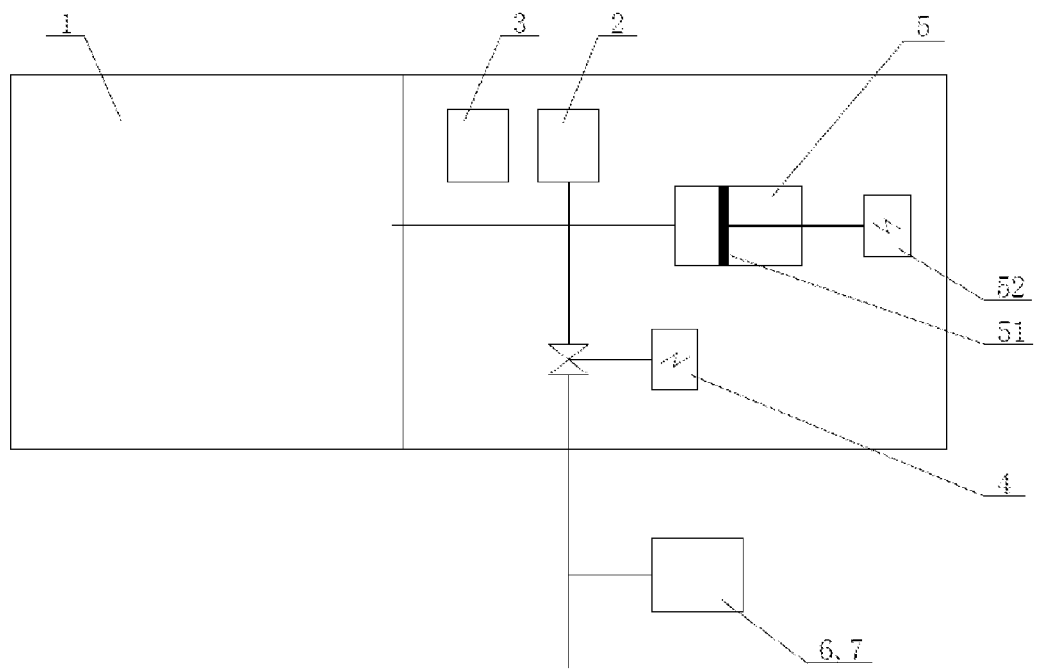
FIG. 5 is a structural schematic diagram of the gas density relay or monitoring device in Embodiment 5.

As shown in FIG. 5, a gas density relay or monitoring device with online self-check function consists of gas density relay body 1, pressure sensor 2, temperature transducer 3, valve 4, pressure regulating mechanism 5, online check contact signal sampling unit 6, and intelligent control unit 7. One end of the valve 4 is connected to the electrical equipment in the form of packing joint through the electrical equipment connecting joint, while the other end of the valve 4 is connected with the base 1 of the gas density relay body 1, pressure sensor 2 and pressure regulating mechanism 5. The pressure sensor 2, temperature transducer 3, valve 4 and pressure regulating mechanism 5 are set on the rear side of the housing of the gas density relay body 1. The online check contact signal sampling unit 6 and intelligent control unit 7 are set on the electrical equipment connecting joint. The pressure sensor 2 is connected with the pressure detector on the gas path through the base of the gas density relay body 1. The pressure regulating mechanism 5 is connected with the pressure detector of the gas density relay body 1. The pressure sensor 2, temperature transducer 3, valve 4 and pressure regulating mechanism 5 are respectively connected with the intelligent control unit 7. Different from Embodiment 1, the pressure sensor 2, temperature transducer 3, valve 4 and pressure regulating mechanism 5 are set on the rear side of the housing of the gas density relay body 1.

Embodiment VI

Figure 6:
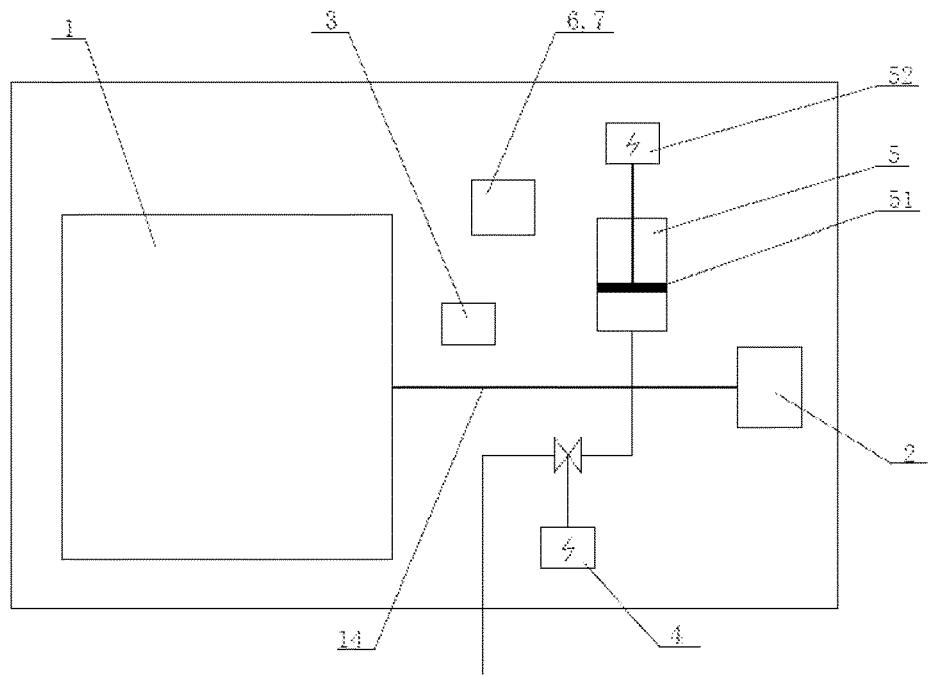
FIG. 6 is a structural schematic diagram of the gas density relay or monitoring device in Embodiment 6.

As shown in FIG. 6, a gas density relay or monitoring device with online self-check function consists of gas density relay body 1, pressure sensor 2, temperature transducer 3, valve 4, pressure regulating mechanism 5, online check contact signal sampling unit 6, and intelligent control unit 7. One end of the valve 4 is connected on the electrical equipment in the form of packing joint through the electrical equipment connecting joint, while the other end of the valve 4 is connected with the connecting pipe which is connected with the pressure detector of the gas density relay body 1. The pressure sensor 2 and pressure regulating mechanism 5 are also connected with the connecting pipe so that the valve 4, pressure sensor 2, pressure regulating mechanism 5 and pressure detector are connected on the gas path. The gas density relay body 1, pressure sensor 2, temperature transducer 3, valve 4, pressure regulating mechanism 5, online check contact signal sampling unit 6, and intelligent control unit 7 are set in a housing. The online check contact signal sampling unit 6 and intelligent control unit 7 are set together. The pressure sensor 2 and temperature transducer 3 are directly or indirectly connected with the intelligent control unit 7. The valve 4 is connected with the intelligent control unit 7. The pressure regulating mechanism 5 is connected with the intelligent control unit 7.

Different from Embodiment 1, the gas density relay body 1, pressure sensor 2, temperature transducer 3, valve 4, pressure regulating mechanism 5, online check contact signal sampling unit 6, and intelligent control unit 7 are set in a housing. 1) The pressure regulating mechanism 5 in this embodiment mainly consists of piston 51 and drive part 52. The piston 51 is connected with the pressure detector of the gas density relay body 1 and the pressure sensor 2 in the form of packing joint, forming a reliable seal cavity. The pressure regulating mechanism 5 makes the drive part 52 drive the piston 51 to move under the control of the intelligent control unit 7, so that the volume of the seal cavity changes, thus completing pressure rise and fall. 2) The pressure sensor 2 and temperature transducer 3 are set in a housing, and may form a gas density transmitter to directly obtain the gas density value, pressure value and temperature value.

Embodiment VII

Figure 7:
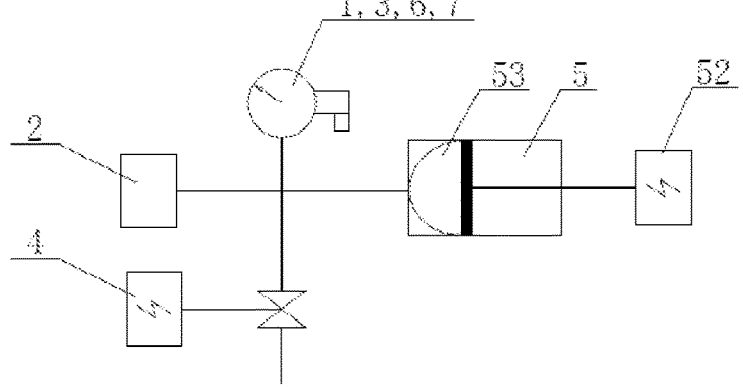
FIG. 7 is a structural schematic diagram of the gas density relay or monitoring device in Embodiment 7.

As shown in FIG. 7, a gas density relay or gas density monitoring device with online self-check function consists of gas density relay body 1, pressure sensor 2, temperature transducer 3, valve 4, pressure regulating mechanism 5, online check contact signal sampling unit 6, and intelligent control unit 7. One end of the valve 4 is connected to the electrical equipment in the form of packing joint through the electrical equipment connecting joint, while the other end of the valve 4 is connected with the pressure detector of the gas density relay body 1. The gas density relay body 1, temperature transducer 3, online check contact signal sampling unit 6, and intelligent control unit 7 are set together. The pressure sensor 2 is connected with the pressure detector of the gas density relay body 1 on the gas path. The pressure regulating mechanism 5 is connected with the pressure detector of the gas density relay body 1 on the gas path. The pressure sensor 2, temperature transducer 3, valve 4 and pressure regulating mechanism 5 are respectively connected with the intelligent control unit 7.

Different from Embodiment 1, the pressure regulating mechanism 5 in this embodiment mainly consists of airbag 53 and drive part 52. The pressure regulating mechanism 5 makes the drive part 52 drive the airbag 53 under the control of the intelligent control unit 7, so that the volume of the airbag changes, thus completing pressure rise and fall.

Embodiment VII

Figure 8:
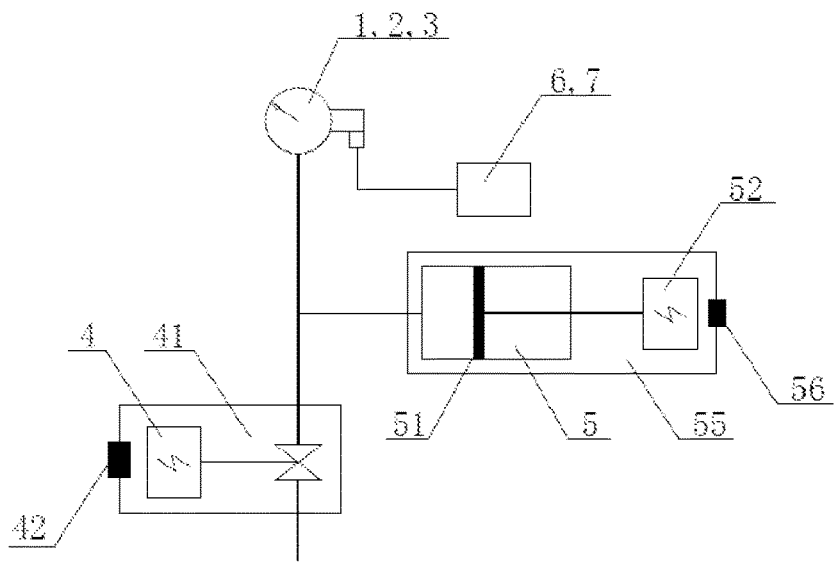
FIG. 8 is a structural schematic diagram of the gas density relay or monitoring device in Embodiment 8.

As shown in FIG. 8, a gas density relay or monitoring device with online self-check function consists of gas density relay body 1, pressure sensor 2, temperature transducer 3, valve 4, pressure regulating mechanism 5, online check contact signal sampling unit 6, and intelligent control unit 7. One end of the valve 4 is connected to the electrical equipment in the form of packing joint through the electrical equipment connecting joint, while the other end of the valve 4 is connected with the pressure detector of the gas density relay body 1. The pressure sensor 2 and temperature transducer 3 are set on the gas density relay body 1. The pressure sensor 2 is connected with the pressure detector of the gas density relay body 1 on the gas path. The pressure regulating mechanism 5 is connected with the pressure detector of the gas density relay body 1. The pressure sensor 2 and temperature transducer 3 are connected with the intelligent control unit 7. The valve 4 is connected with the intelligent control unit 7. The pressure regulating mechanism 5 is connected with the intelligent control unit 7.

Different from Embodiment 1, the valve 4 is sealed in the first housing 41, and the control cable of valve 4 is led out through the first lead seal 42 which is sealed with the first housing 41. Such design ensues that the valve 4 keeps sealed and operates reliably for a long term. The pressure regulating mechanism 5 is sealed in the second housing 55, and the control cable of pressure regulating mechanism 5 is led out through the second lead seal 56 which is sealed with the second housing 55. Such design ensues that the pressure regulating mechanism 5 keeps sealed and operates reliably for a long term. The second housing 55 and the first housing 41 can also be integrated.

Embodiment IX

Figure 9:
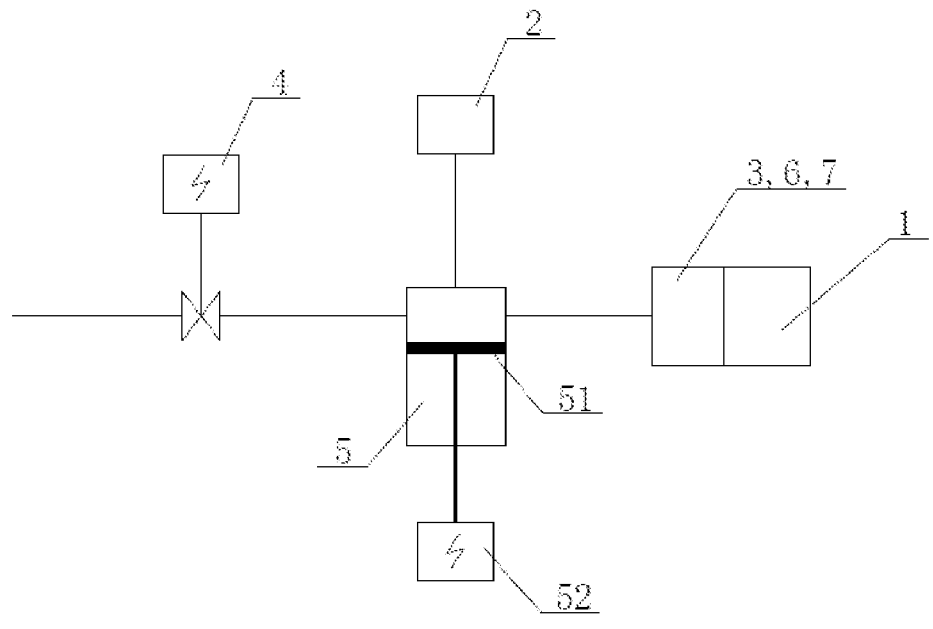
FIG. 9 is a structural schematic diagram of the gas density relay or monitoring device in Embodiment 9.

As shown in FIG. 9, a gas density relay or monitoring device with online self-check function consists of gas density relay body 1, pressure sensor 2, temperature transducer 3, valve 4, pressure regulating mechanism 5, online check contact signal sampling unit 6, and intelligent control unit 7. One end of the valve 4 is connected to the electrical equipment in the form of packing joint through the electrical equipment connecting joint, while the other end of the valve 4 is connected with the pressure regulating mechanism 5. The pressure sensor 2 is set on the pressure regulating mechanism 5. The temperature transducer 3, online check contact signal sampling unit 6, intelligent control unit 7 and gas density relay body 1 are set on the pressure regulating mechanism 5. The pressure detector of the gas density relay body 1, pressure sensor 2, pressure regulating mechanism 5 and valve 4 are connected on the gas path. The temperature transducer 3, online check contact signal sampling unit 6 and intelligent control unit 7 are set together. The pressure sensor 2 and temperature transducer 3 are connected with the intelligent control unit 7. The valve 4 is connected with the intelligent control unit 7. The pressure regulating mechanism 5 is connected with the intelligent control unit 7.

Embodiment X

Figure 10:
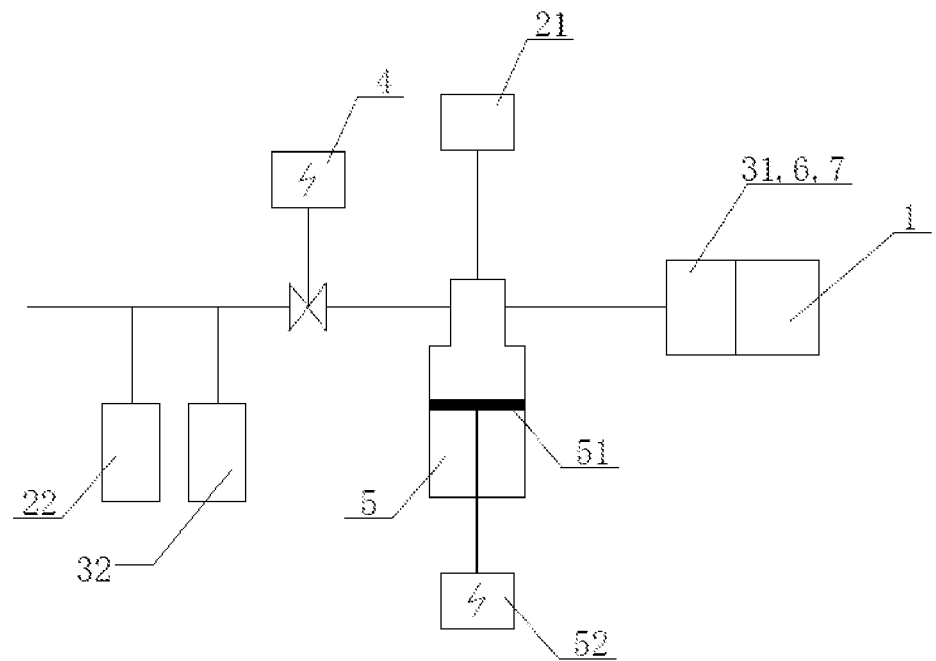
FIG. 10 is a structural schematic diagram of the gas density relay or monitoring device in Embodiment 10.

As shown in FIG. 10, a gas density relay or monitoring device with online self-check function consists of gas density relay body 1, the first pressure sensor 21, the second pressure sensor 22, the first temperature transducer 31, the second temperature transducer 32 valve 4, pressure regulating mechanism 5, online check contact signal sampling unit 6, and intelligent control unit 7. One end of the valve 4 is connected to the electrical equipment in the form of packing joint through the electrical equipment connecting joint, while the other end of the valve 4 is connected with the pressure regulating mechanism 5. The gas density relay body 1, temperature transducer 31, online check contact signal sampling unit 6, and intelligent control unit 7 are set together on the pressure regulating mechanism 5. The first pressure sensor 21 is set on the pressure regulating mechanism 5. The second pressure sensor 22 and the second temperature transducer 32 are set on the side where the valve 4 is connected with the electrical connecting joint. The first pressure sensor 21 and the pressure detector of gas density relay body 1 are connected with the pressure regulating mechanism 5 on the gas path. The first pressure sensor 21, the second pressure sensor 22, the first temperature transducer 31 and the second temperature transducer 32 are connected with the intelligent control unit 7. The valve 4 is connected with the intelligent control unit 7. The pressure regulating mechanism 5 is connected with the intelligent control unit 7.

Different from Embodiment 1, there are two pressure sensors, i.e. the first pressure sensor 21 and the second pressure sensor 22, respectively. There are two temperature transducers, i.e. the first temperature transducer 31 and the second temperature transducer 32, respectively. In this embodiment, the temperature transducer 32 can be omitted. There are several pressure sensors and temperature transducers in this embodiment, and the pressure values monitored by multiple pressure sensors can be compared and checked mutually. The temperature values obtained from multiple temperature transducers can be compared and checked mutually. The multiple gas density values obtained from multiple pressure sensors and multiple temperature transducers can be compared and checked mutually.

Embodiment XI

Figure 11:
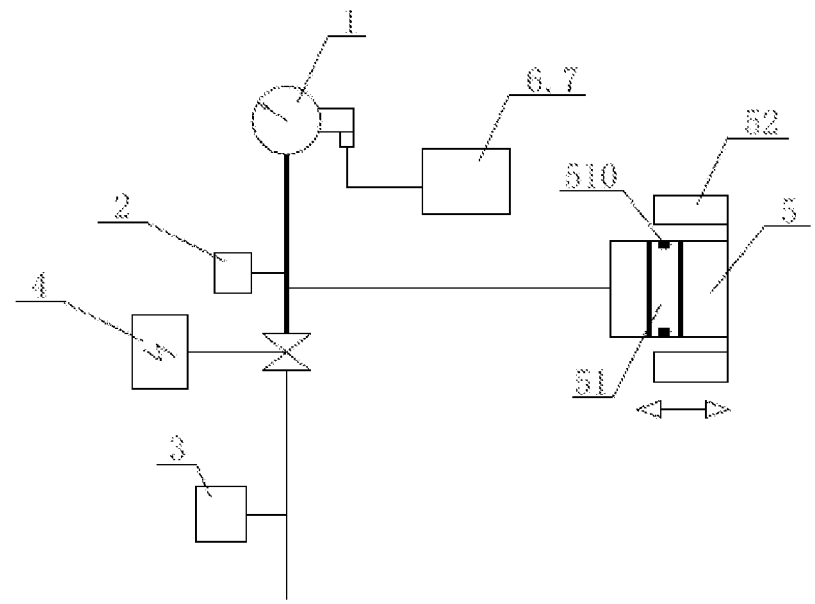
FIG. 11 is a structural schematic diagram of the gas density relay or monitoring device in Embodiment 11.

As shown in FIG. 11, a gas density relay or monitoring device with online self-check function consists of gas density relay body 1, pressure sensor 2, temperature transducer 3, valve 4, pressure regulating mechanism 5, online check contact signal sampling unit 6, and intelligent control unit 7. One end of the valve 4 is connected to the electrical equipment in the form of packing joint through the electrical equipment connecting joint, while the other end of the valve 4 is connected with the connecting pipe which is connected with the pressure detector of gas density relay body 1. The pressure sensor 2 and pressure regulating mechanism 5 are also connected with the connecting pipe so that the valve 4, pressure sensor 2, pressure regulating mechanism 5 and pressure detector are connected on the gas path. The temperature transducer 3 is set on the side where the valve 4 is connected with the electrical connecting joint. The online check contact signal sampling unit 6 and intelligent control unit 7 are set together. The pressure sensor 2, temperature transducer 3, valve 4 and pressure regulating mechanism 5 are respectively connected with the intelligent control unit 7.

In addition, the pressure regulating mechanism 5 in this embodiment mainly consists of piston 51 and drive part 52. One end of the piston 51 is connected with the gas density relay body 1 in the form of packing joint, forming a reliable seal cavity. The pressure regulating mechanism 5 makes the drive part 52 drive the piston 51 to move under the control of the intelligent control unit 7, so that the volume of the seal cavity changes, thus completing pressure rise and fall. The drive part 52 is set outside the seal cavity, while the piston 51 is set inside the seal cavity. The drive part 52 drives the piston 51 to move through electromagnetic force, that is the piston 51 and drive part 52 enable the piston 51 to move through magnetic force.

Embodiment 12

Figure 12:
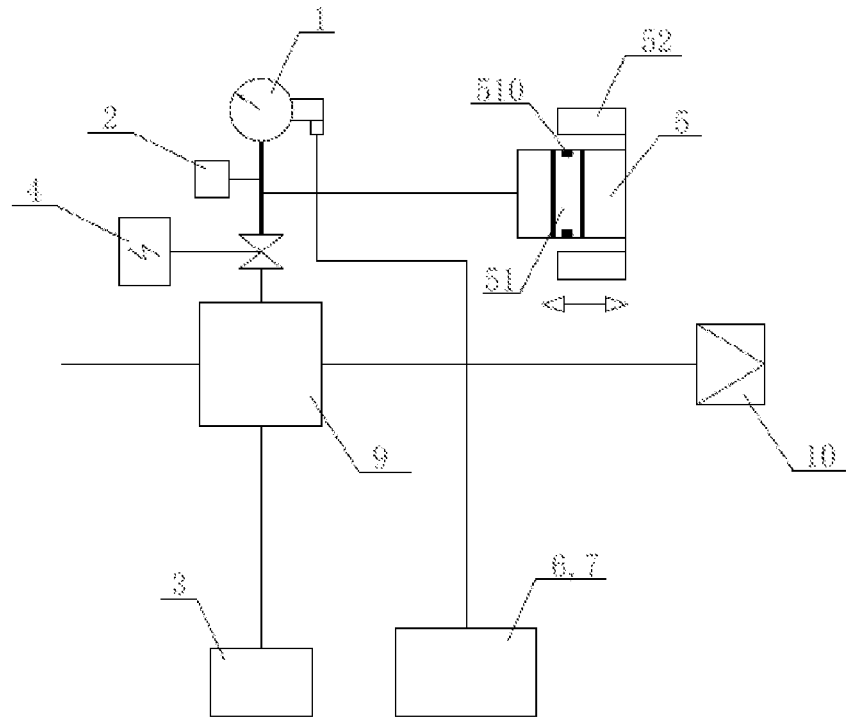
FIG. 12 is a structural schematic diagram of the gas density relay or monitoring device in Embodiment 12.

As shown in FIG. 12, the gas density relay or gas density monitoring device in this embodiment is additionally equipped with air admission interface 10 and multichannel joint 9 on the basis of Embodiment 11. The interface between the valve 4 and electrical equipment is connected to the first interface of the multichannel joint 9. The gas density relay body 1 is connected with the multichannel joint 9 through the valve 4. The second interface of the multichannel joint 9 is used to connect the electrical equipment. The air admission interface 10 and the temperature transducer 3 are respectively installed on the multichannel joint 9.

Embodiment 13

Figure 13:
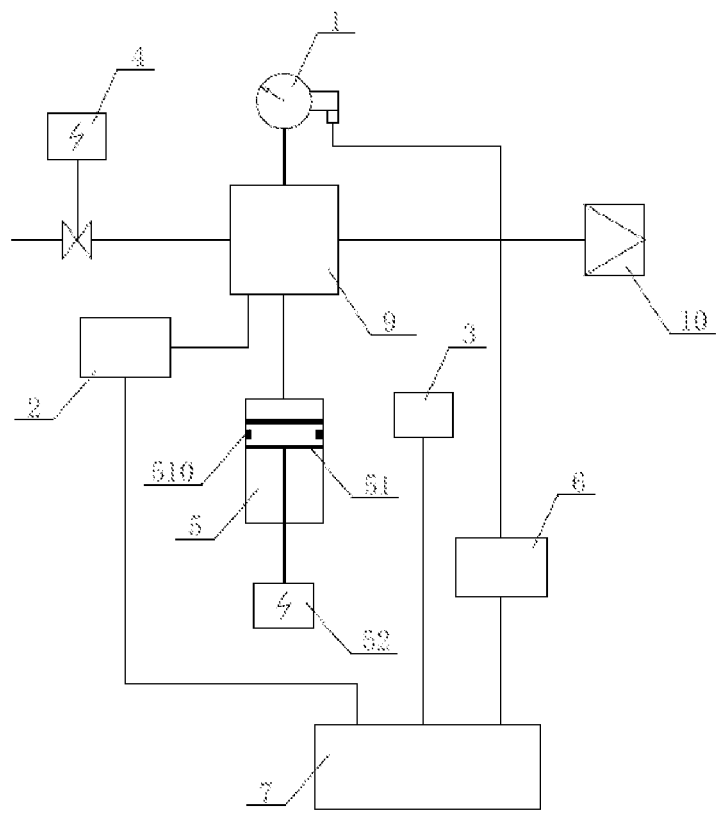
FIG. 13 is a structural schematic diagram of the gas density relay or monitoring device in Embodiment 13.

The gas density relay or monitoring device in this embodiment is additionally equipped with multichannel joint 9. As shown in FIG. 13, a gas density relay or monitoring device with online self-check function consists of gas density relay 1, pressure sensor 2, temperature transducer 3, valve 4, pressure regulating mechanism 5, online check contact signal sampling unit 6, intelligent control unit 7, multichannel joint 9 and air admission interface 10. The gas density relay 1, valve 4, pressure sensor 2, pressure regulating mechanism 5 and air admission interface 10 are arranged on the multichannel joint 9. Specifically, the gas inlet of the valve 4 is equipped with an interface connected with the electrical equipment. The gas inlet is connected to the electrical equipment in the form of packing joint, and connected with the air chamber of the electrical equipment. The gas outlet of the valve 4 is connected with the gas density relay 1 through the multichannel joint 9. The pressure sensor 2 is connected with the gas density relay 1 on the gas path through the multichannel joint 9. The pressure regulating mechanism 5 is connected with the gas density relay 1 through the multichannel joint 9. The online check contact signal sampling unit 6 is connected respectively with the gas density relay 1 and the intelligent control unit 7. The valve 4, pressure sensor 2, temperature transducer 3 and pressure regulating mechanism 5 are respectively connected with the intelligent control unit 7. The air admission interface 10 is connected with the multichannel joint 9.

Embodiment 14

Figure 14:
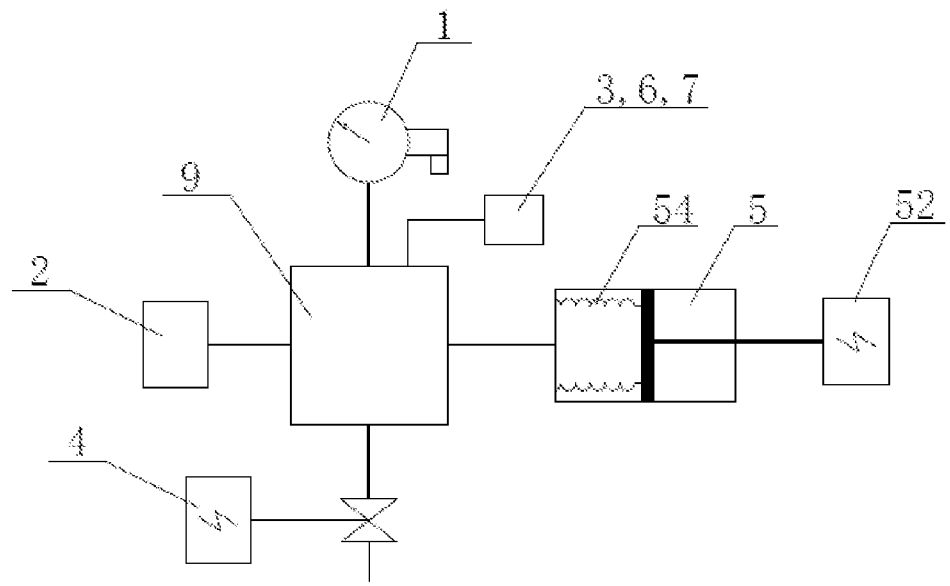
FIG. 14 is a structural schematic diagram of the gas density relay or monitoring device in Embodiment 14.

The gas density relay or monitoring device in this embodiment is additionally equipped with multichannel joint 9. As shown in FIG. 14, a gas density relay or monitoring device with online self-check function consists of gas density relay 1, pressure sensor 2, temperature transducer 3, valve 4, pressure regulating mechanism 5, online check contact signal sampling unit 6, intelligent control unit 7, and multichannel joint 9. The gas inlet of valve 4 is connected to the equipment connecting joint in the form of packing joint, and the gas outlet of valve 4 is connected with the multichannel joint 9. The gas density relay body 1 is installed on the multichannel joint 9. The pressure sensor 2 is installed on the multichannel joint 9. The pressure sensor 2 is connected with the pressure detector of the gas density relay body 1 on the gas path. The pressure regulating mechanism 5 is installed on the multichannel joint 9. The pressure regulating mechanism 5 is connected with the pressure detector of the gas density relay body 1. The temperature transducer 3, online check contact signal sampling unit 6, and intelligent control unit 7 are set together on the multichannel joint 9. The pressure sensor 2, temperature transducer 3, valve 4 and pressure regulating mechanism 5 are respectively connected with the intelligent control unit 7.

The pressure regulating mechanism 5 in this embodiment mainly consists of bellows 54 and drive part 52. The bellows 54 is connected with the pressure detector of the gas density relay body 1 in the form of packing joint, forming a reliable seal cavity. The pressure regulating mechanism 5 makes the drive part 52 drive the volume of bellows 54 to change under the control of the intelligent control unit 7 so that the volume of the seal cavity changes, thus completing pressure rise and fall. The pressure is regulated by the pressure regulating mechanism 5 to enable the contact action of the gas density relay body 1. The contact action is transmitted to the intelligent control unit 7 through the online check contact signal sampling unit 6. The intelligent control unit 7 detects the alarm and/or blocking contact signal operating value and/or return value of the gas density relay body 1 according to the pressure value and temperature value of gas density relay body 1 at the time of contact action which are converted to the corresponding gas density values, thus completing the check of the gas density relay body 1.

Embodiment 15

Figure 15:
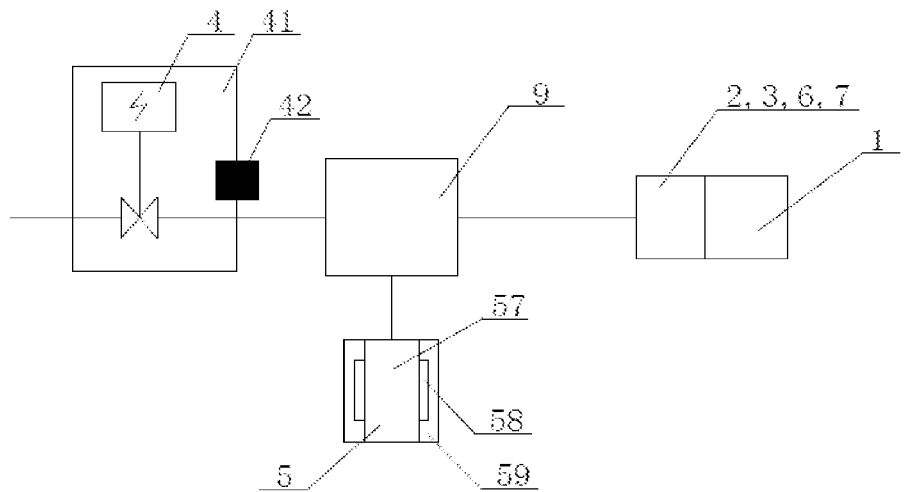
FIG. 15 is a structural schematic diagram of the gas density relay or monitoring device in Embodiment 15.

The gas density relay or monitoring device in this embodiment is additionally equipped with multichannel joint 9. As shown in FIG. 15, a gas density relay or gas density monitoring device with online self-check function consists of gas density relay body 1, pressure sensor 2, temperature transducer 3, valve 4, pressure regulating mechanism 5, online check contact signal sampling unit 6, intelligent control unit 7 and multichannel joint 9. The gas inlet of valve 4 is connected to the electrical equipment, and the gas outlet of valve 4 is connected with the multichannel joint 9. The valve 4 is sealed in the first housing 41, and the control cable of valve 4 is led out through the first lead seal 42 which is sealed with the first housing 41. Such design ensues that the valve 4 keeps sealed and operates reliably for a long term. The gas density relay body 1 is installed on the multichannel joint 9. The pressure regulating mechanism 5 is installed on the multichannel joint 9. The pressure sensor 2, temperature transducer 3, online check contact signal sampling unit 6, and intelligent control unit 7 are set on the gas density relay body 1. The pressure sensor 2 and the gas density relay body 1 are connected with the pressure regulating mechanism 5 on the gas path. The valve 4, pressure regulating mechanism 5, pressure sensor 2 and temperature transducer 3 are respectively connected with the intelligent control unit 7.

The pressure regulating mechanism 5 in this embodiment mainly consists of air chamber 57, heating element 58 and heat insulation element 59. The heating element 58 is installed outside (or inside) the air chamber 57, and temperature change arises from heating by the heating element 58 to complete pressure rise and fall. The pressure is regulated by the pressure regulating mechanism 5 to enable the contact action of the gas density relay body 1. The contact action is transmitted to the intelligent control unit 7 through the online check contact signal sampling unit 6. The intelligent control unit 7 detects the alarm and/or blocking contact signal operating value and/or return value of the gas density relay according to the pressure value and temperature value of gas density relay body 1 at the time of contact action which are converted to the corresponding gas density values, thus completing the check of the gas density relay.

The working principle of this embodiment is as below: When the gas density relay needs a check, the intelligent control unit 7 controls the heating element 58 of the pressure regulating mechanism 5 to heat. When the temperature difference between the temperature value of pressure regulating mechanism 5 and that of the temperature transducer 3 reaches the set value, the valve 4 can be closed through the intelligent control unit 7 so that the gas density relay is disconnected from the electrical equipment on the gas path. Then, the heating element 58 of the pressure regulating mechanism 5 is cut off immediately to stop heating of the heating element 58. Then, gas pressure of the airtight air chamber 57 of the pressure regulating mechanism 5 gradually drops so that the alarm and/or blocking contact of gas density relay body 1 acts respectively. The contact action is transmitted to the intelligent control unit 7 through the online check contact signal sampling unit 6. The intelligent control unit 7 detects the alarm and/or blocking contact signal operating value and/or return value of the gas density relay according to the density value at the time of alarm and/or blocking contact action, thus completing the check of the gas density relay.

The installation site of the multichannel joint 9 may be flexible as required. For example, the gas path of the pressure regulating mechanism 5 is connected with the gas density relay body 1 through the first connecting pipe. The first interface of the multichannel joint 9 is connected to the first connecting pipe between the gas density relay body 1 and the pressure regulating mechanism 5. The valve 4 is connected with the second interface of the gas multichannel joint 9 and connected with the gas density relay body 1 through the multichannel joint 9. Moreover, when the gas density relay or monitoring device includes a moisture sensor, the moisture sensor can be also set on the multichannel joint 9. When the gas density relay or monitoring device includes a decomposition product sensor, the decomposition product sensor can be also set on the multichannel joint 9. When the gas density relay or monitoring device includes an air admission interface, the air admission interface can be also set to the multichannel joint 9. We will not list any more here.

Embodiment 16

Figure 16:
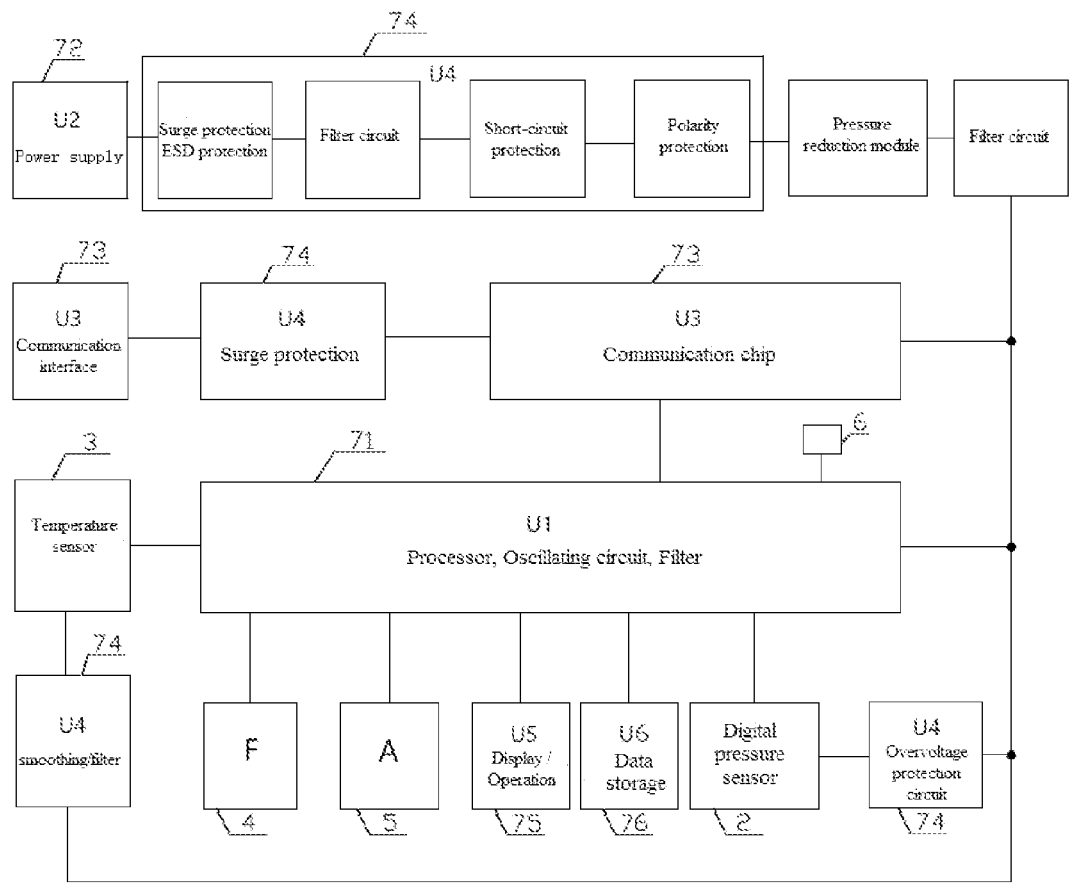
FIG. 16 is a schematic diagram of the control loop of the gas density relay or monitoring device in Embodiment 16.

As shown in FIG. 16, the intelligent control unit 7 mainly consists of a processor 71 (U1), a power supply 72 (U2), a communication module 73 (U3), an intelligent control unit protection circuit 74 (U4), a display and output and operation 75 (U5) as well as a data storage 76 (U6). The processor 71 (U1) includes a quartz oscillator and filter circuit. The intelligent control unit protection circuit 74 (U4) includes a surge protection circuit, a filter circuit, a short-circuit protection circuit, a polarity protection circuit and an overvoltage protection circuit. The power supply of secondary class also includes a voltage-reduction module.

Where, the communication mode of the communication module 73 (U3) could be wire communication, such as RS232 bus, RS485 bus, CAN-BUS and other industrial buses, optical fiber Ethernet, 4-20 mA, Hart, IIC, SPI, Wire, coaxial cable and power line carrier (PLC), or wireless communication, such as 2G/3G/4G/5G, WIFI, Bluetooth, Lora, Lorawan, Zigbee, infrared, ultrasonic wave, sound wave, satellite, optical wave, quantum communication and sonar. The display and output 75 (U5) could be digital tube, LED, LCD, HMI, display, matrix screen, printer, fax, projector and mobile phone, or a flexible combination of one or more of the above. The data storage 76 (U6) can be FLASH, RAM, ROM, HDD, SD and other flash memory cards, tape, punch tape, optical disc, USB flash drive, disc or film, or a flexible combination of one or more of the above.

Embodiment 17

Figure 17:
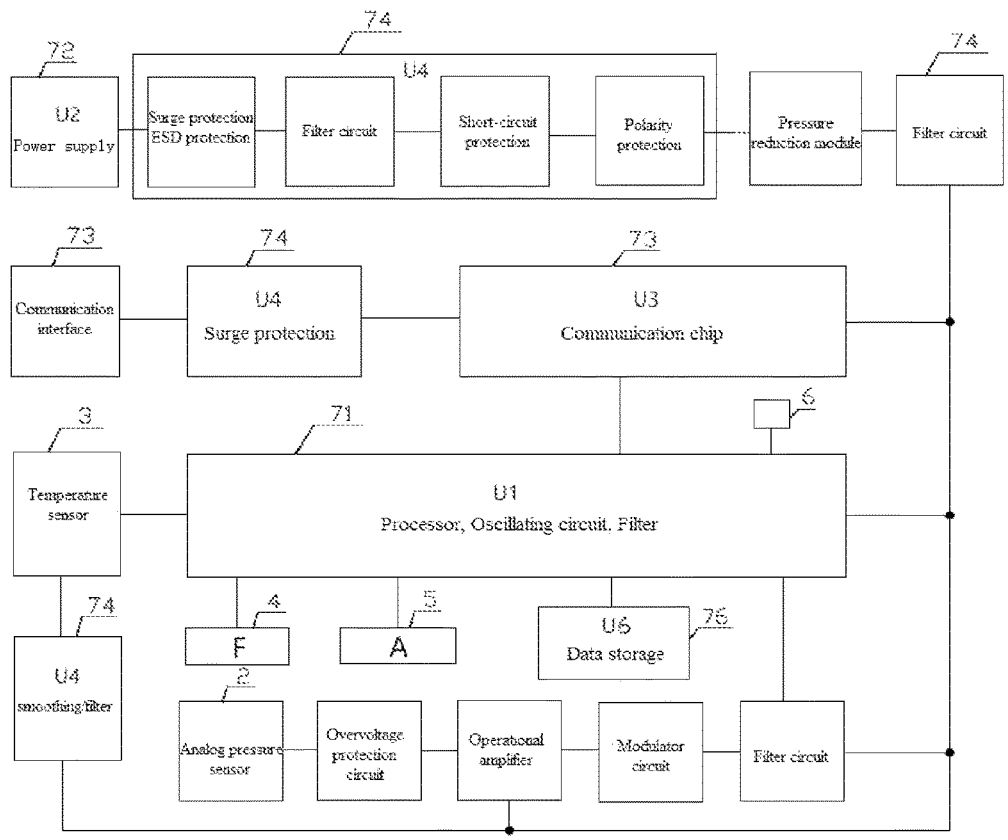
FIG. 17 is a schematic diagram of the control loop of the gas density relay or monitoring device in Embodiment 17.
Figure 18:
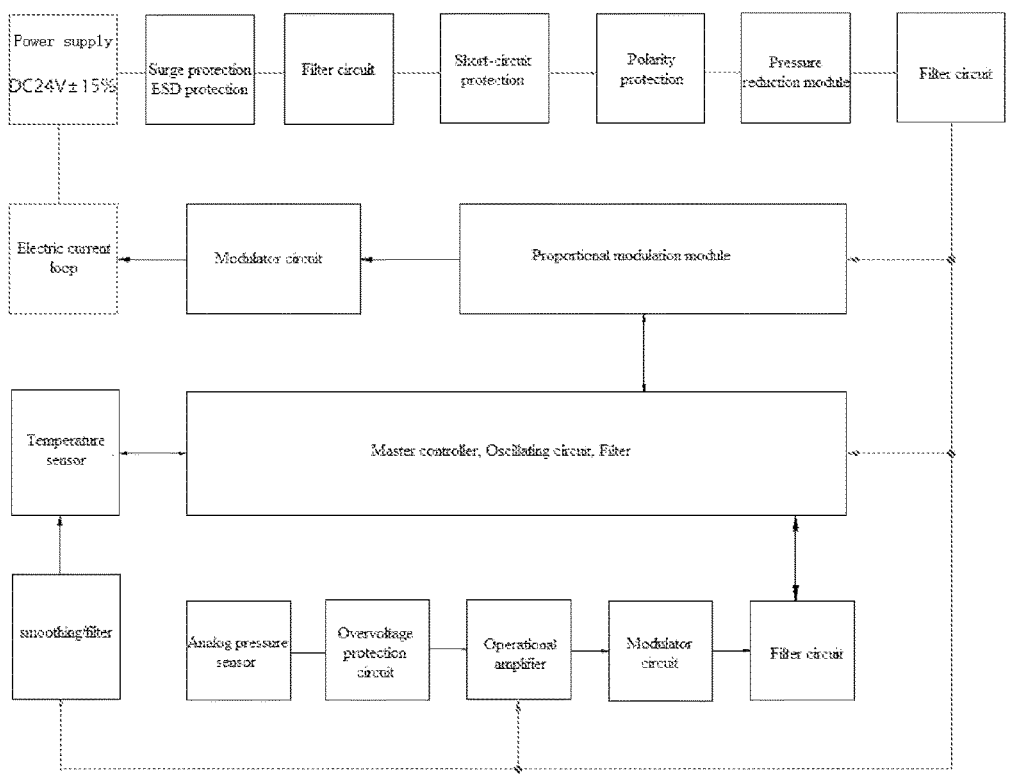
FIG. 18 is a schematic diagram of the circuit of a 4-20 mA density transmitter on the gas density relay or monitoring device.

As shown in FIG. 17, the intelligent control unit 7 mainly consists of a processor 71 (U1), a power supply 72 (U2), a communication module 73 (U3) and an intelligent control unit protection circuit 74 (U4). The processor 71 (U1) includes a quartz oscillator and filter circuit. The intelligent control unit protection circuit 74 (U4) includes a surge protection circuit, a filter circuit, a short-circuit protection circuit, a polarity protection circuit and an overvoltage protection circuit. The power supply of secondary class also includes a voltage-reduction module. The pressure sensor 2 sends a signal to the modulator circuit via the overvoltage protection circuit and operational amplifier circuit, and then to the processor 71 (U1) via the filter circuit. In the communication module 73 (U3), it goes through the communication chip to the communication interface via the surge protection circuit.

Embodiment 18

As shown in FIG. 18, 4-20Ma type density transmitter mainly consists of a microprocessor (including master controller, quartz oscillator and filter circuit), a power supply, a modulator circuit, an electric current loop, a protection circuit, an analog pressure sensor, an operational amplifier, a temperature transducer, a proportional modulation module and a pressure-reduction module. The microprocessor includes a quartz oscillator and filter circuit. The protection circuit includes surge protection circuit, filter circuit, short-circuit protection circuit, polarity protection circuit and overvoltage protection circuit. The analog pressure sensor sends a signal to the modulator circuit via the overvoltage protection circuit and operational amplifier circuit, and then to the microprocessor via the filter circuit so that the microprocessor can acquire the pressure value and temperature value, and obtain the density value signal after calculation and conversion. After the density value signal goes through the proportional modulation module, modulator circuit and electric current loop, the density value of 4-20Ma is obtained.

In summary, the signals from analog pressure sensor, temperature transducer and moisture sensor go through the amplifier circuit, then are converted at A/D and to MCU for acquisition of pressure, temperature and water. The intelligent control unit 7 can include or be connected with printer and liquid crystal display, and can be also used for USB storage and RS232 communication.

Embodiment 19

In the embodiment, the gas density relay or monitoring device with online self-check function also includes a background monitoring terminal, wherein the gas density relay or monitoring device can be used for remote communication through communication equipment and the monitoring terminal.

Figure 19:
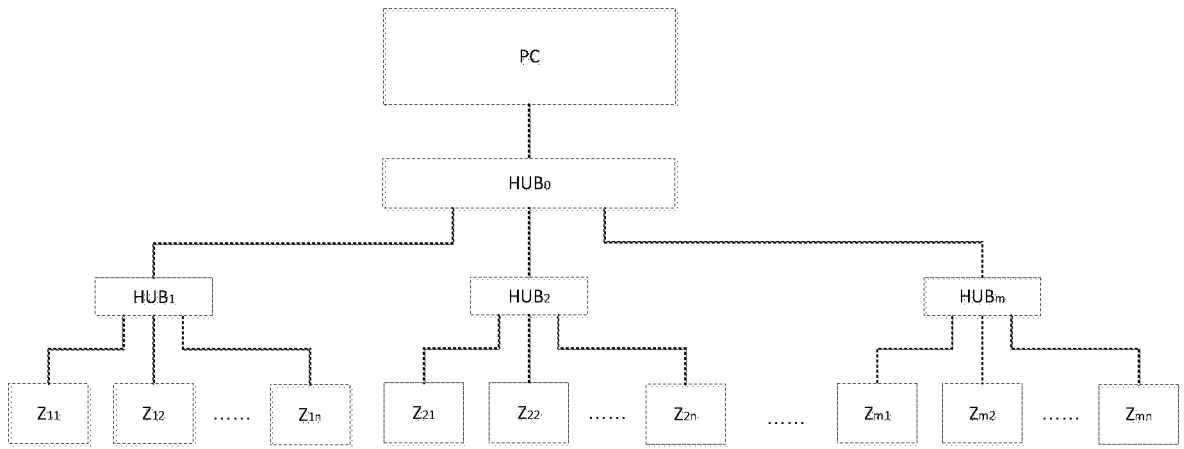
FIG. 19 is a schematic diagram of the system architecture of a gas density relay in Embodiment 19.
Figure 20:
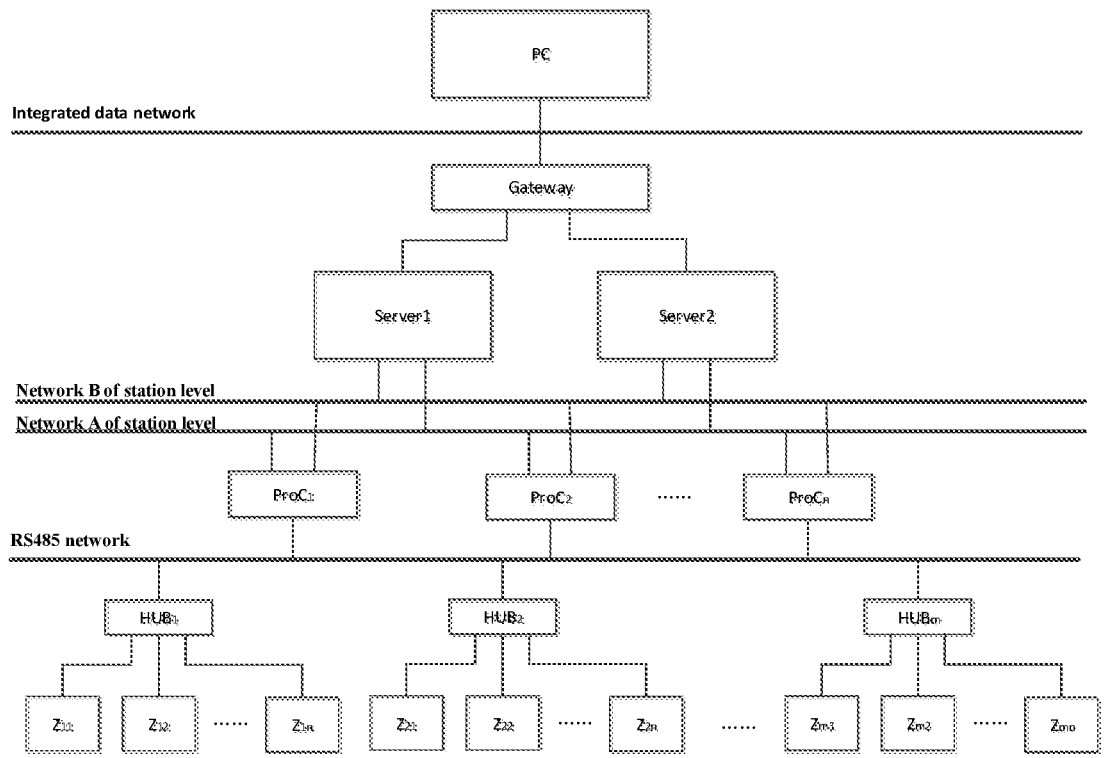
FIG. 20 is a schematic diagram of the system architecture of a gas density relay in Embodiment 20.
Figure 21:
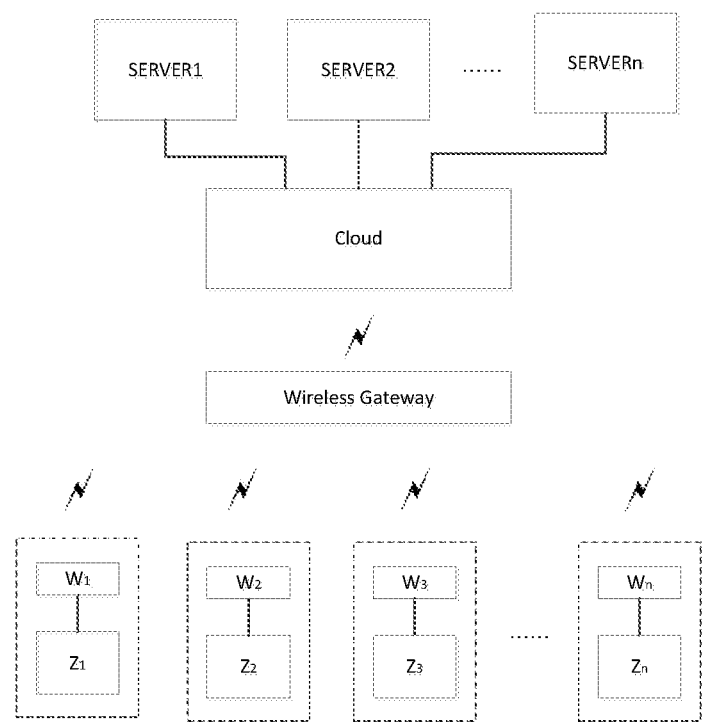
FIG. 21 is a schematic diagram of the system architecture of a gas density relay in Embodiment 21.

As shown in FIG. 19, multiple HV electrical equipment with SF6 air chamber, multiple gas density relays or monitoring devices are connected with the background monitoring terminal through concentrator and IEC61850 protocol converter. Each gas density relay or monitoring device is arranged onto corresponding HV electrical equipment with SF6 air chamber, respectively. In the embodiment, the background monitoring terminal PC is communicated with multiple concentrators HUB (HUB1, HUB2, . . . HUBm) through HUB0. Each concentrator HUB is connected with a set of gas density relays or monitoring devices, for example, the concentrator HUB1 is connected with the gas density relays (or monitoring devices) Z11, Z12, . . . , Z22, . . . Z2n, . . . , the concentrator HUB2 is connected with the gas density relays (or monitoring devices) Z21, Z22, . . . , Z2n, . . . , and the concentrator HUBm is connected with the gas density relays (or monitoring devices) Zm1, Zm2, . . . , Zmn, where m and n are natural numbers.

The background monitoring terminal includes: 1) background software platform: based on Windows, Linux and so on, or VxWorks, Android, Unix, UCos, FreeRTOS, RTX, embOX and MacOS. 2) Background software key business module: for example, authority management, equipment management, data storage and query, as well as user management, alarm management, real-time data, historical data, real-time curve, historical curve, configuration management, data acquisition, data analysis, record conditions and anomaly handling. 3) Interface configuration: for example, Form interface, Web interface and configuration interface.

Embodiment 20

In comparison with Embodiment 19, the embodiment additionally includes network switch Gateway, integrated application server (Server), protocol converter/online monitoring intelligent unit ProC. In the embodiment, the background monitoring terminal PC is connected with two integrated application servers Server 1 and Server 2 through the network switch Gateway, and the two integrated application servers Server 1 and Server 2 are communicated with multiple protocol converters/online monitoring intelligent units ProC (ProC1, ProC2, ProCn) through network A and B of station level, and the protocol converter/online monitoring intelligent unit ProC are communicated with multiple concentrators HUB (HUB1, HUB2, HUBm) through 5485 network. Each concentrator HUB is connected with a set of gas density relays or monitoring devices, for example, the concentrator HUB1 is connected with the gas density relays (or monitoring devices) Z11, Z12, . . . , Z22, . . . , Z2n, . . . , the concentrator HUB2 is connected with the gas density relays (or monitoring devices) Z21, Z22, . . . , Z2n, . . . , and the concentrator HUBm is connected with the gas density relays (or monitoring devices) Zm1, Zm2, . . . Zmn, where m and n are natural numbers.

Embodiment 21

The embodiment is an architectural schematic diagram of wireless transmission mode. In the diagram, the gridline indicates wireless module Wn and gas density relay (or monitoring device) Zn can be made into an integer or split parts flexibly.

Multiple integrated application servers Server 1, Server 2, Server n are communicated with the gas density relays (or monitoring devices) in a wireless manner through Cloud, Wireless Gateway and gas density relays (or monitoring devices). where n is natural number.

It should be described that, in the above content, the gas density relay with online self-check function generally refers to an integral structure of components, and the gas density monitoring device generally refers to a split structure of components, the combination is flexible.

In conclusion, the invention provides a gas density relay with online self-check function and its check method. It is composed of a gas path (through pipeline) connection part, a pressure regulation part, a signal measurement control part and so on, the device mainly carries out online check and measurement of the contact signal (pressure value during alarm/blocking action) of the gas density relay under the ambient temperature and automatically converts the value into the corresponding pressure value at 20° C. to detect the performance of the contact (alarm and blocking) value of the gas density relay online. The installation positions of gas density relay, pressure sensor, temperature transducer, pressure regulating mechanism, valve, online check contact signal sampling unit and intelligent control unit can be flexibly combined. For example, the gas density relay body, the pressure sensor, the temperature transducer, the online check contact signal sampling unit and the intelligent control unit can be combined together, integrally designed, separately designed, installed on the housing or the multichannel joint, or connected together through the connecting pipe. The valve may be directly connected to the electrical equipment, or connected to the electrical equipment through the self-sealing valve or the air pipe. The pressure sensor, the temperature transducer, the online check contact signal sampling unit and the intelligent control unit can be combined together or integrally designed; the pressure sensor and the temperature transducer can be combined together or integrally designed; and the online check contact signal sampling unit and the intelligent control unit can be combined together or integrally designed. In short, the structure is not limited to one type.

When the contacts of the density relay are checked at high temperature, low temperature, normal temperature, and 20° C. ambient temperature, the gas density relay or monitoring device with online self-check function has different error judgment requirements for the contacts. The specific requirements can be implemented according to the relevant standards and the temperature. The gas density relay can compare its error performance according to different temperatures and different periods. In other words, the performance of the gas density relay is determined by comparison in different periods and the same temperature range. Specifically, comparison of various periods and comparison of history and present. The density relay body may also be subjected to examination. The density relay contact signal may be checked at any time if necessary, and whether the density values of the gas density relay body and the monitored electrical equipment are normal or not is judged. That is, the density relay or monitoring device can judge, analyze and compare the normal and abnormal density value, gas density relay body, pressure sensor and temperature transducer of electrical equipment, so as to judge, compare and analyze the gas density monitoring, density relay body and other states of electrical equipment. It can also monitor the contact signal state of gas density relay and transmit its state to the remote. The open or closed contact signal state of gas density relay can be known in the background, so as to realize more monitoring and improve reliability. The gas density relay or monitoring device can also detect and determine the temperature compensation performance and the contact resistance of the gas density relay body. It can also detect and determine the temperature compensation performance of the gas density relay body.

This application has compact and reasonable structure arrangement, and various components have better anti-rust and anti-vibration abilities, are firmly installed and reliably used. The connection and disassembly for various pipelines of the gas density relay are easy to operate, and the equipment and component are convenient to maintain. In this application, the gas density relay check can be completed without maintainer at the site, so as to greatly improve the reliability of power grid, increase work efficiency and reduce operating and maintenance cost.

The specific embodiments of the present disclosure are described in details above, and used as examples only. The present disclosure is not limited to the specific embodiments described above. For the personnel skilled in the art, any equal modification and replacement to the present disclosure shall be in the scope of the present disclosure. Therefore, the equal change and modification made without deviating from the spirit and scope of the present disclosure shall be covered within the scope of the present disclosure.

The invention claimed is:

1. A gas density relay with online self-check function, comprising a gas density relay body, a gas density sensor, a pressure regulating mechanism, a valve, an online check contact signal sampling unit, and an intelligent control unit;
   wherein a gas path of the pressure regulating mechanism is connected with the gas density relay body, the pressure regulating mechanism being configured to enable a contact signal action of the gas density relay body in response to pressure rise and fall of the gas density relay body;
   wherein the gas density detection sensor is communicated with the gas density relay body;
   wherein the online check contact signal sampling unit is connected with the gas density relay body and configured to sample contact signals of the gas density relay body under the ambient temperature;
   wherein one end of the valve is provided with an interface connected with the electrical equipment, and wherein the other end of the valve is connected with the gas density relay body or with the gas path of the pressure regulating mechanism to connect the valve with the gas density relay body;
   wherein the intelligent control unit is connected with the gas density sensor, the pressure regulating mechanism, the valve, and the online check contact signal sampling unit, wherein the intelligent control unit is configured to manage the closing or opening of the valve, to control the pressure regulating mechanism, to collect pressure values, temperature values or gas density values, and to detect the contact signal operating value or contact signal return value of the gas density relay body; and
   wherein the contact signals include one of alarm signals and blocking signals.

2. The gas density relay with online self-check function according to claim 1, wherein the gas density relay body includes a housing and a base, a pressure detector, a temperature compensation element and several signal generators arranged in the housing, the signal generator comprising a microswitch or a magnetically assisted electric contact, the gas density relay body outputs the contact signals through the signal generator; where the pressure detector comprises a Bourdon tube or bellows; and wherein the temperature compensation element uses a temperature compensation strip or gas closed in the housing.

3. The gas density relay with online self-check function according to claim 2, wherein the gas path of the pressure regulating mechanism is connected with the pressure detector; wherein the other end of the valve is connected with the base and the pressure detector, or alternatively with the gas path of the pressure regulating mechanism, so as to connect the valve with the base and the pressure detector; and wherein the online check contact signal sampling unit is connected with the signal generator.

4. The gas density relay with online self-check function according to claim 1, wherein the gas density sensor is arranged on the gas density relay body; alternatively, the pressure regulating mechanism is arranged on the gas density relay body; alternatively, the gas density sensor, the online check contact signal sampling unit and the intelligent control unit are installed on the gas density relay body; alternatively, the pressure regulating mechanism, the gas density sensor, the online check contact signal sampling unit and the intelligent control unit are installed on the gas density relay body.

5. The gas density relay with the online self-check function according to claim 1, wherein the gas density detection sensor comprises at least one pressure sensor and at least one temperature transducer; wherein the pressure sensor is installed on a gas path of the gas density relay body, the temperature transducer is installed on or outside the gas path of the gas density relay body, or installed in the gas density relay body, or installed outside the gas density relay body.

6. The gas density relay with the online self-check function according to claim 1, wherein the pressure regulating mechanism is a closed air chamber, a heating element and/or a refrigeration element being arranged outside or inside the closed air chamber;
- wherein during check, heating is achieved through the heating element, and/or refrigeration is achieved through the refrigeration element, so that the temperature of gas in the closed air chamber is changed, and pressure rise and fall of the gas density relay is completed; or
- wherein the pressure regulating mechanism is a cavity with an opening at one end, and the other end of the cavity is communicated with the gas density relay body; wherein a piston is arranged in the cavity, one end of the piston being connected with a regulating rod, the outer end of the regulating rod being connected with a drive part, wherein the other end of the piston extends into the opening and hermetically contacts with the inner wall of the cavity, and the drive part drives the regulating rod to drive the piston to move in the cavity; or
- wherein the pressure regulating mechanism is a closed air chamber, with a piston arranged in the closed air chamber, wherein the piston hermetically contacts with the inner wall of the closed air chamber, and a drive part is arranged outside the closed air chamber and pushes the piston to move in the cavity through electromagnetic force; or
- wherein the pressure regulating mechanism is an airbag with one end connected with the drive part, wherein the volume of the airbag is changed under drive of the drive part, and the airbag is communicated with the gas density relay body; or
- wherein the pressure regulating mechanism is a bellows, wherein one end of the bellows is connected with the gas density relay body, and the other end is retractable under the drive of the drive part; alternatively,
- wherein the pressure regulating mechanism is a deflation valve, and the deflation valve is a solenoid valve or valve with electrically motorized operation, alternatively,
- wherein the pressure regulating mechanism is a compressor; or
- wherein the pressure regulating mechanism is a pump, the pump includes any of pressure pump, booster pump, electrical gas pump and electromagnetic gas pump; and
- wherein the drive part is one of a magnetic force, a motor, a reciprocating mechanism, a Carnot cycle mechanism, and a pneumatic component.

7. The gas density relay with online self-check function according to claim 1, wherein the valve is a valve with electrically motorized operation and/or solenoid valve, a piezoelectric valve with electrically motorized operation, temperature control valve, or the new valve that is made of intelligent memory materials and opened or closed with electric heating.

8. The gas density relay with the online self-check function according to claim 1, wherein the intelligent control unit acquires gas density values collected by the gas density detection sensor; or, alternatively, the intelligent control unit acquires pressure values and temperature values collected by the gas density detection sensor, so that the gas density of the monitored electrical equipment is online monitored by the gas density relay.

9. The gas density relay with online self-check function according to claim 8, wherein the intelligent control unit calculates the gas density value by the averaging method, which is that, in a set time interval, the collection frequency is set, and all the N gas density values at different time points are calculated for the average value to obtain the gas density value;
- wherein, alternatively, in a set time interval, a temperature interval step is set, and the density values corresponding to N different temperature values collected in all temperature ranges are calculated for the average value to obtain the gas density value;
- wherein, alternatively, in a set time interval, a pressure interval step is set, and the density values corresponding to N different pressure values collected in all pressure change ranges are calculated for the average value to obtain the gas density value;
- wherein N is a positive integer greater than or equal to 1.

10. The gas density relay with the online self-check function according to claim 1, wherein the intelligent control unit acquires the gas density values collected by the gas density detection sensor when the gas density relay body performs contact signal operating or switching, and online check of the gas density relay is achieved; or,
- the intelligent control unit acquires the pressure value and temperature value collected by the gas density sensor when the contact signal of the gas density relay body is operated or switched, and converts them into the pressure value corresponding to 20° C. according to the gas pressure-temperature characteristics, that is, the gas density value, and completes the online check of the gas density relay.

11. The gas density relay with online self-check function according to claim 1, further comprising a multichannel joint, on which the gas density relay body, wherein the valve and the pressure regulating mechanism are arranged; or alternatively, the valve and the pressure regulating mechanism are arranged on the multichannel joint; or alternatively, the gas density relay body, the gas density sensor, the valve and the pressure regulating mechanism are arranged on the multichannel joint.

12. The gas density relay with online self-check function according to claim 1, further comprising a self-sealing valve, which is installed between the electrical equipment and the valve or installed between the electrical equipment and the self-sealing valve.

13. The gas density relay with online self-check function according to claim 1, further comprising an air admission interface; wherein the air admission interface is arranged on the pressure regulating mechanism; alternatively, the air admission interface is arranged on the electrical equipment; alternatively, the air admission interface is arranged between the electrical equipment and the valve; alternatively, the air admission interface is arranged on a second connecting pipe, wherein the second connecting pipe is connected with the gas path of the valve and the pressure regulating mechanism;

alternatively, the second connecting pipe is connected with the valve and the gas density relay body.

14. The gas density relay with online self-check function according to claim 1, further comprising a background monitoring terminal; where the gas density relay can realize remote communication with communication equipment and the background monitoring terminal; wherein the communication equipment is used to realize the data transmission between the gas density relay and the background monitoring terminal; wherein the communication mode of the communication equipment includes wire communication and wireless communication.

15. The gas density relay with online self-check function according to claim 14, wherein the intelligent control unit is controlled through field control and/or the background monitoring terminal.

16. The gas density relay with online self-check function according to claim 14, wherein at least two gas density relays with online self-check function are connected with the background monitoring terminal through the concentrator and protocol converter in sequence; and wherein each gas density relay is arranged onto corresponding electrical equipment respectively.

17. A method for checking the gas density relay of claim 1, comprising:
 in a normal working state, the gas density relay monitoring the gas density value in the electrical equipment;
 based on the set check time and gas density value, and under the condition that the check of the gas density relay is permitted, the gas density relay:
  closing the valve via the intelligent control unit;
  driving the pressure regulating mechanism by the intelligent control unit to slowly decrease the gas pressure and enable the contact action of the gas density relay body;
  transmitting the contact action to the intelligent control unit through the online check contact signal sampling unit;
  obtaining via the intelligent control unit the gas density value according to the pressure value and temperature value during the contact action, or directly obtaining the gas density value, detecting the contact signal operating value of the gas density relay body, and completing the check of the contact signal operating value of the gas density relay;
 wherein when all the check of contact signals is completed, the intelligent control unit opens the valve.

18. The check method of claim 17, further comprising:
 in the normal working state, the gas density relay monitoring the gas density value in the electrical equipment, and at the same time, the gas density relay monitoring the gas density value in the electrical equipment online via a gas density detection sensor and the intelligent control unit;
 based on the set check time and gas density value, and under the condition that the check of the gas density relay is permitted, the gas density relay:
  closing the valve via the intelligent control unit;
  adjusting the online check contact signal sampling unit to the check state by the intelligent control unit;
  in the check state, the online check contact signal sampling unit cutting off the contact signal control loop of the gas density relay body and connecting the contact of the gas density relay body to the intelligent control unit;
  driving the pressure regulating mechanism is driven by the intelligent control unit to slowly decrease the gas pressure and enable the contact action of the gas density relay body;
  transmitting the contact action to the intelligent control unit through the online check contact signal sampling unit;
  obtaining via the intelligent control unit the gas density value according to the pressure value and temperature value during the contact action, or directly obtaining the gas density value, detecting the contact signal operating value of the gas density relay body, and completing the check of the contact signal operating value of the gas density relay;
  the pressure regulating mechanism driven by the intelligent control unit slowly increasing the gas pressure and enable the contact reset of the gas density relay body; transmitting the contact reset signal to the intelligent control unit through the online check contact signal sampling unit;
  obtaining via the intelligent control unit the gas density value according to the pressure value and temperature value when the contact resets, or directly obtaining the gas density value, detecting the contact signal return value of the gas density relay body, and completing the check of the contact signal return value of the gas density relay;
  when all the check of contact signals is completed, the intelligent control unit opening the valve and adjusting the online check contact signal sampling unit to the working state, and the contact signal control loop of the gas density relay body returning to the normal operation state.

19. A method for modifying the gas density relay according to claim 1, comprising:
 communicating data from the gas density detection sensor with the gas density relay body;
 connecting the gas path of the gas density relay body with the first interface of the multichannel joint;
 connecting the gas path of the pressure regulating mechanism with the second interface of the multichannel joint, wherein the first interface is connected with the second interface, so that the gas path of the pressure regulating mechanism is connected with the gas density relay body; the pressure regulating mechanism controls the pressure rise and fall of the gas density relay body, to enable the contact signal action of the gas density relay body;
 directly or indirectly connecting the online check contact signal sampling unit with the gas density relay body, wherein the online check contact signal sampling unit samples the contact signal of the gas density relay body at ambient temperature;
 respectively connecting the intelligent control unit with the gas density sensor, the pressure regulating mechanism and the online check contact signal sampling unit to complete the control of the pressure regulating mechanism, the acquisition of pressure value and temperature value, and/or the acquisition of gas density value, and detecting the contact signal operating value and/or contact signal return value of the gas density relay body;
 wherein the contact signals include alarm signals and/or blocking signals.

20. The method of claim 19, comprising connecting one end of the valve with the electrical equipment, and connecting the other end of the valve with the pressure regulating mechanism and the gas path of the gas density relay body, and further connecting the valve with the intelligent control unit so that the valve can be closed or opened under the control of the intelligent control unit.

* * * * *